(12) United States Patent
Kim et al.

(10) Patent No.: US 10,691,248 B2
(45) Date of Patent: Jun. 23, 2020

(54) DRIVING CIRCUIT, TOUCH DISPLAY DEVICE, AND METHOD FOR DRIVING THE TOUCH DISPLAY DEVICE

(71) Applicant: LG Display Co., Ltd., Seoul (KR)

(72) Inventors: CheolSe Kim, Daegu (KR); BuYeol Lee, Goyang-si (KR); YongChan Park, Seoul (KR); Suyun Ju, Gangwon-do (KR)

(73) Assignee: LG Display Co., Ltd., Seoul (KR)

( * ) Notice: Subject to any disclaimer, the term of this patent is extended or adjusted under 35 U.S.C. 154(b) by 319 days.

(21) Appl. No.: 15/258,915

(22) Filed: Sep. 7, 2016

(65) Prior Publication Data

US 2017/0068384 A1 Mar. 9, 2017

Related U.S. Application Data

(63) Continuation-in-part of application No. 14/985,032, filed on Dec. 30, 2015.

(30) Foreign Application Priority Data

Sep. 8, 2015 (KR) .......................... 10-2015-0127300
Mar. 22, 2016 (KR) .......................... 10-2016-0034127

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0416; G06F 3/0412; G06F 3/044
See application file for complete search history.

(56) References Cited

U.S. PATENT DOCUMENTS

| 8,253,699 | B2 | 8/2012 | Son |
| 9,965,118 | B2 * | 5/2018 | Shepelev ................ G06F 3/044 |
| 9,977,538 | B2 * | 5/2018 | Zhao ..................... G06F 3/0412 |
| 10,006,937 | B2 * | 6/2018 | Bushnell ................. G01R 1/04 |

(Continued)

FOREIGN PATENT DOCUMENTS

| CN | 101334544 A | 12/2008 |
| CN | 203933865 U | 11/2014 |
| WO | WO 2015/047374 A1 | 4/2015 |

OTHER PUBLICATIONS

United States Office Action, U.S. Appl. No. 14/985,032, dated Jan. 23, 2017, 21 pages.

(Continued)

*Primary Examiner* — Jeff Piziali
(74) *Attorney, Agent, or Firm* — Fenwick & West LLP

(57) ABSTRACT

The present embodiments relate to a touch technology and, more particularly, to a touch display device, which includes multiple first electrodes embedded in a display panel, at least one second electrode positioned outside the display panel, and a touch force sensing gap existing between the multiple first electrodes and the at least one second electrode, a method for driving the same, and a driving circuit for driving the multiple first electrodes and the at least one second electrode. The present embodiments, as described above, make it possible to sense not only a touch position, but also a touch force, with which the user presses the screen during a touch.

11 Claims, 45 Drawing Sheets

(56) References Cited

U.S. PATENT DOCUMENTS

| | | | |
|---|---|---|---|
| 10,048,789 B2* | 8/2018 | Filiz | G06F 3/0414 |
| 10,067,583 B2* | 9/2018 | Grip | G04G 21/08 |
| 2009/0002312 A1 | 1/2009 | Son | |
| 2011/0193794 A1 | 8/2011 | Hu et al. | |
| 2014/0085247 A1 | 3/2014 | Leung et al. | |
| 2014/0267128 A1 | 9/2014 | Bulea et al. | |
| 2014/0347318 A1* | 11/2014 | Kim | G06F 3/044 |
| | | | 345/174 |
| 2015/0346866 A1 | 12/2015 | Kunosoki et al. | |
| 2016/0004368 A1* | 1/2016 | Kurasawa | G09G 3/3446 |
| | | | 345/174 |
| 2016/0092015 A1 | 3/2016 | Al-Dahle et al. | |
| 2016/0098120 A1 | 4/2016 | Miyake | |
| 2016/0098131 A1 | 4/2016 | Ogata et al. | |
| 2016/0139716 A1* | 5/2016 | Filiz | G06F 3/0414 |
| | | | 345/174 |
| 2016/0378255 A1* | 12/2016 | Butler | G01L 1/146 |
| | | | 345/174 |

OTHER PUBLICATIONS

Advisory Action, U.S. Appl. No. 14/985,032, dated Feb. 14, 2018, 4 pages.

U.S. Office Action, U.S. Appl. No. 14/985,032, dated Nov. 15, 2017, 24 pages.

U.S. Office Action, U.S. Appl. No. 14/985,032, dated May 3, 2017, 19 pages.

United States Office Action, U.S. Appl. No. 14/985,032, dated Jun. 30, 2016, 16 pages.

United States Office Action, U.S. Appl. No. 14/985,032, dated Oct. 5, 2018, 22 pages.

United States Office Action, U.S. Appl. No. 14/985,032, dated Apr. 18, 2019 15 pages.

* cited by examiner

FIG.3
Case 1
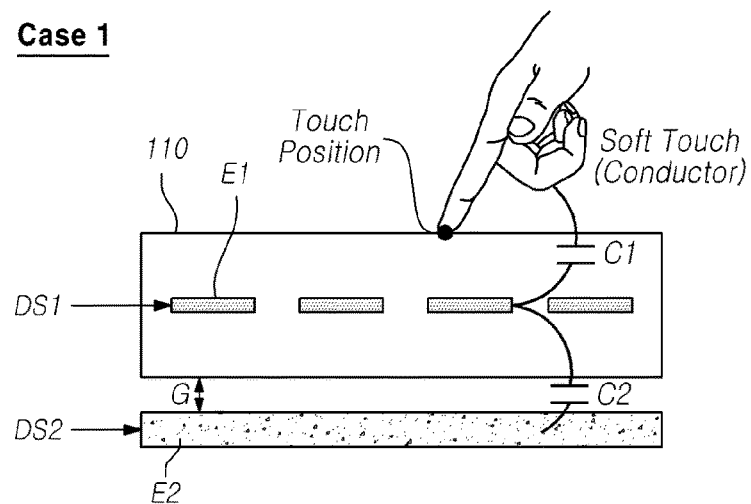
Case 2
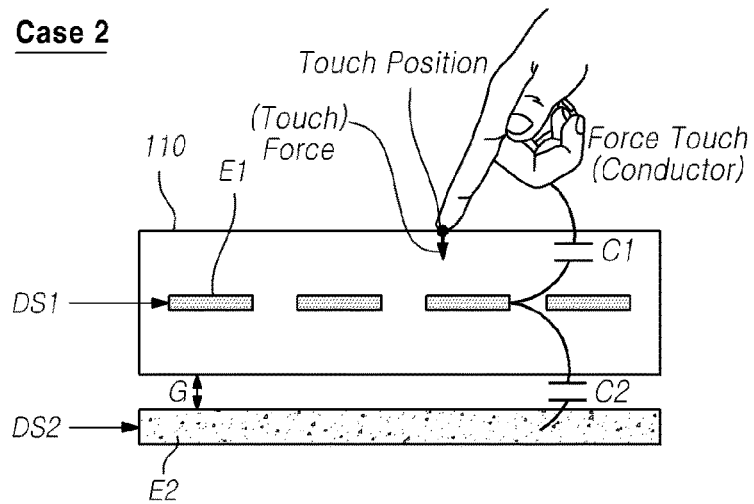
Case 3
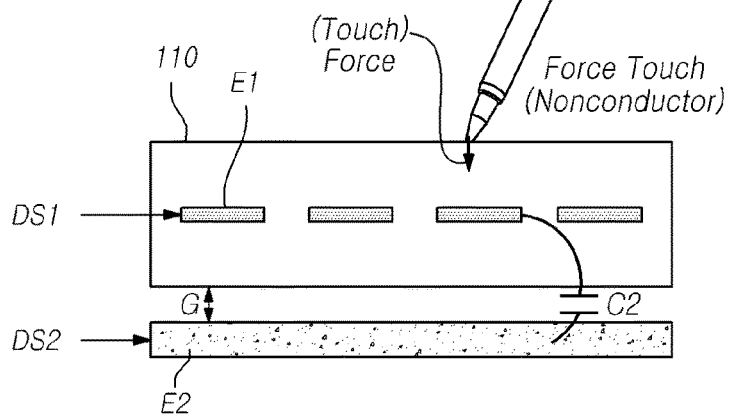

FIG.4
Case 1 & Case 2
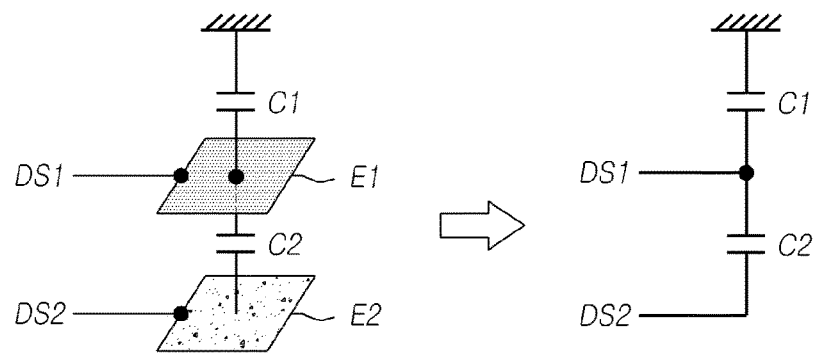
Case 3
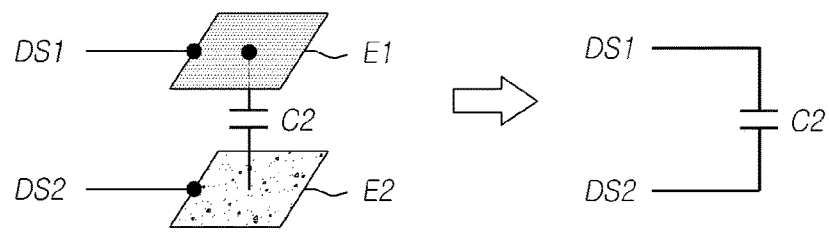

FIG. 17
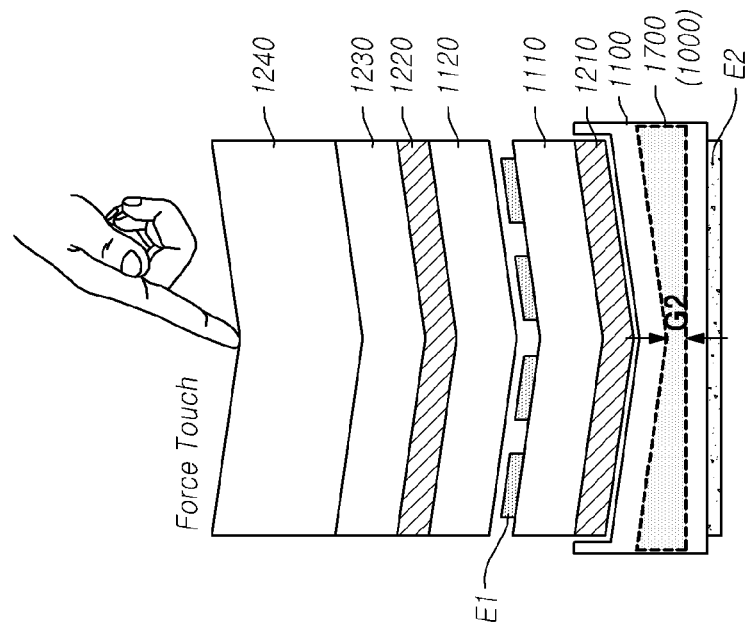
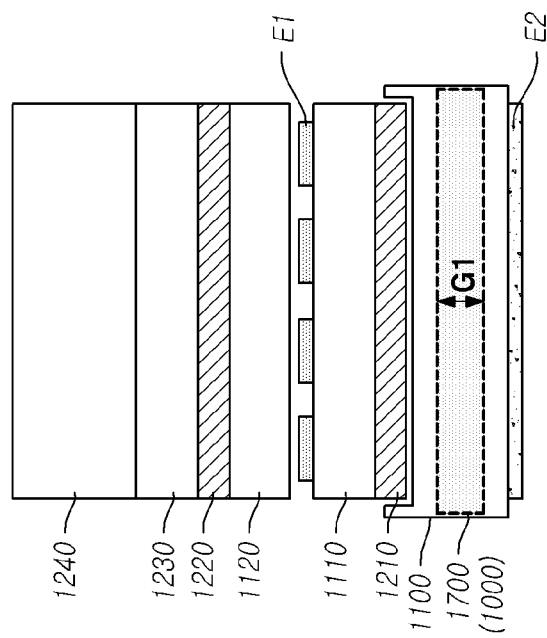

FIG.19
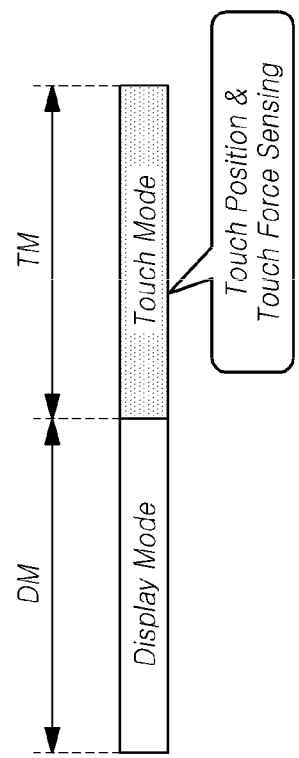
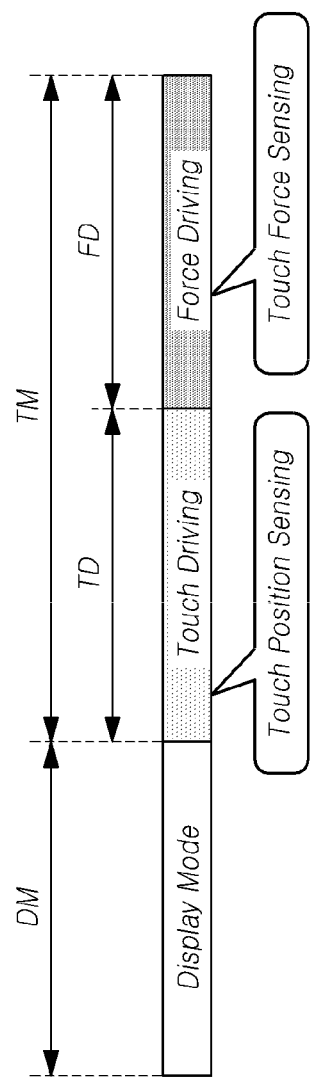

FIG.20C
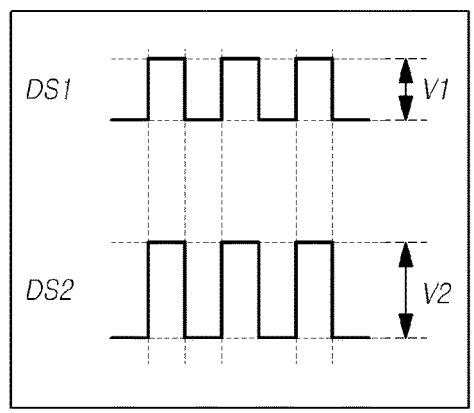
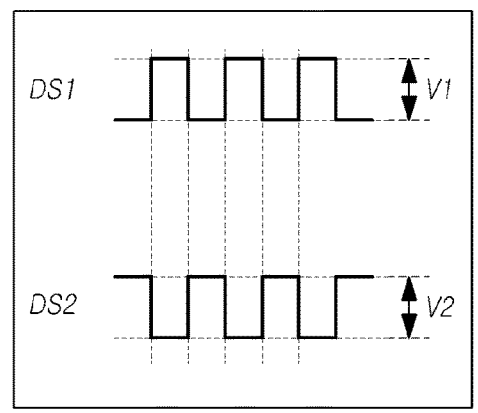
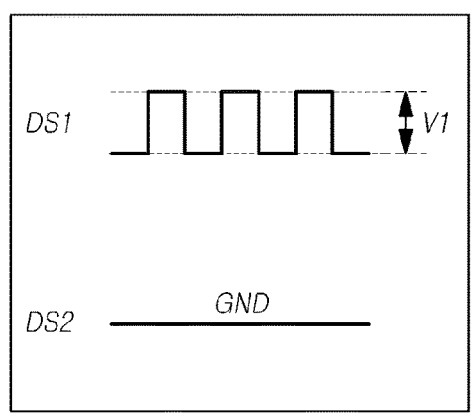
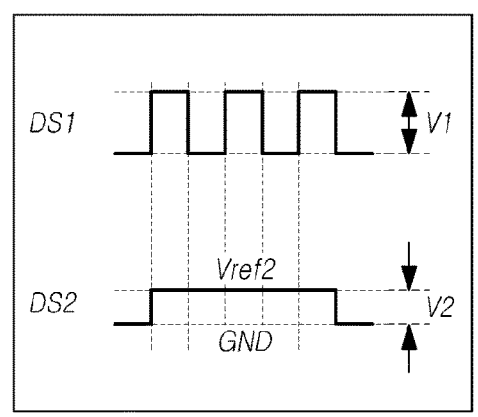

FIG.22D
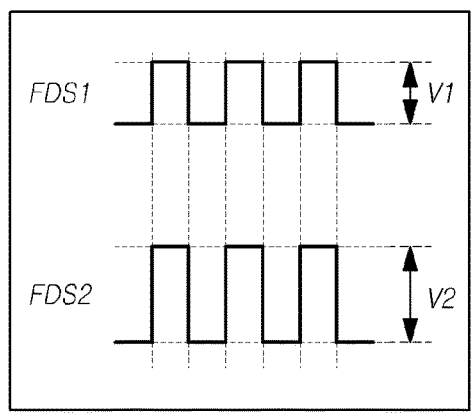
Combination 1
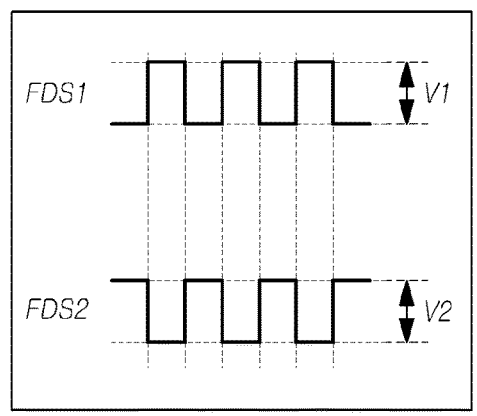
Combination 2
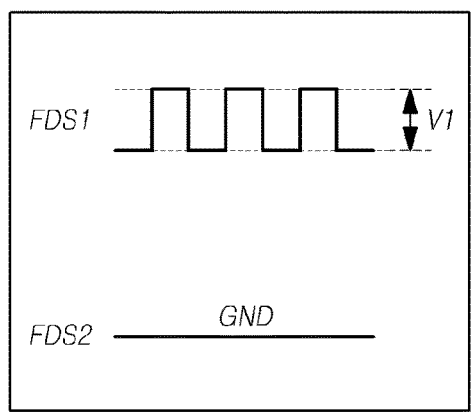
Combination 3
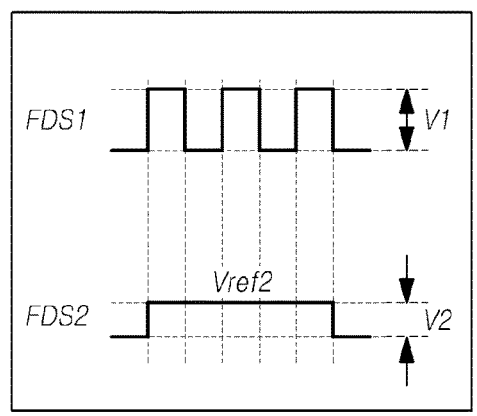
Combination 4

FIG.22E
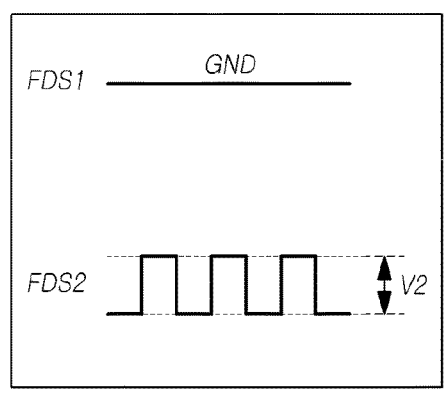
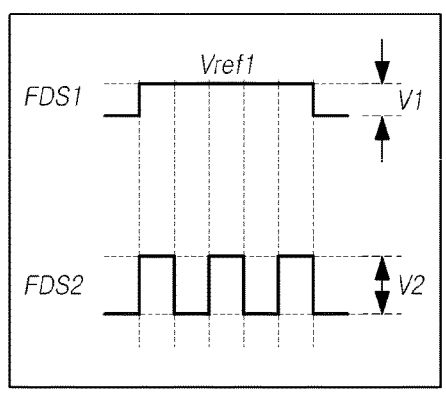
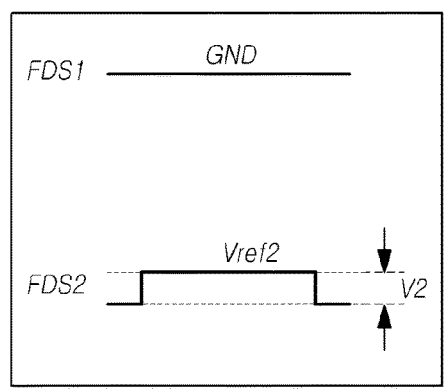
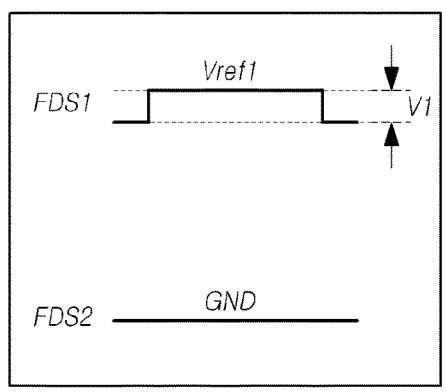

DRIVING CIRCUIT, TOUCH DISPLAY DEVICE, AND METHOD FOR DRIVING THE TOUCH DISPLAY DEVICE

CROSS-REFERENCE TO RELATED APPLICATION

This application claims priority from Korean Patent Application No. 10-2015-0127300, filed on Sep. 8, 2015, Korean Patent Application No. 10-2016-0034127, filed on Mar. 22, 2016, and U.S. patent application Ser. No. 14/985,032, filed on Dec. 30, 2015, which are hereby incorporated by reference for all purposes as if fully set forth herein.

BACKGROUND OF THE INVENTION

1. Field of the Invention

The present embodiments relate to a driving circuit, a touch display device, and a method for driving the same.

2. Description of the Prior Art

Development of information-oriented societies has been increasing various kinds of demands for display devices for displaying images, and various types of display devices have been used, such as a liquid crystal display device, a plasma display device, and an organic light-emitting display device.

Among the display devices, furthermore, mobile devices, such as smart phones and tablets, and medium/large-sized devices, such as smart televisions, provide touch-type input processing according to user convenience, device characteristics, and the like.

Display devices capable of such touch input processing are evolving to provide more diversified functions, and user demands are also becoming more diversified.

However, the currently applied type of touch input processing, in which the user's touch position (touch coordinate) is solely sensed and relevant input processing is performed in the sensed touch position, has its limitations in the current situation which requires provision of many functions of various kinds and satisfaction of various user demands.

SUMMARY OF THE INVENTION

An aspect of the present embodiments is to provide a touch display device, a method for driving the same, and a driving circuit, the touch display device being structured such that it cannot only sense the coordinate (position) of a touch generated by the user, but also sense the touch force, with which the user presses the screen during the touch, in order to provide various functions in various types.

Another aspect of the present embodiments is to provide a driving circuit, a touch display device, and a method for driving the same, which enable simultaneous proceeding of driving for sensing a touch position and driving for sensing a touch force during a touch mode period.

Another aspect of the present embodiments is to provide a driving circuit, a touch display device, and a method for driving the same, which enable separate proceedings of driving for sensing a touch position and driving for sensing a touch force during a touch mode period.

Another aspect of the present embodiments is to provide a driving circuit, a touch display device, and a method for driving the same, which can recognize the position of occurrence of a touch force, i.e. a force with which the user's touch presses the screen.

Another aspect of the present embodiments is to provide a driving circuit, a touch display device, and a method for driving the same, which can accurately distinguish between a soft touch, i.e. the force with which the user's touch presses the screen does not exist or is equal to or less than a predetermined level, and a force touch, i.e. the force with which the user's touch presses the screen exists or exceeds the predetermined level.

Another aspect of the present embodiments is to provide a touch display device including a display panel, on which multiple first electrodes are arranged, a second electrode positioned outside the display panel, and a touch force sensing gap, which exists between the multiple first electrodes and the second electrode, and which can change its size according to a touch force such that touch force sensing is possible.

According to an aspect, the present embodiments may include a touch display device including: multiple first electrodes embedded in a display panel; at least one second electrode positioned outside the display panel; and at least one touch force sensing gap existing between the multiple first electrodes and the second electrode such that a capacitor is formed between the multiple first electrodes and the second electrode.

In connection with such a touch display device, the touch force sensing gap is variable according to a touch force of a touch applied to the display panel.

According to another aspect, the present embodiments may provide a method for driving a touch display device, including: driving a display panel during a display mode period; and successively applying a first electrode driving signal to at least one of multiple first electrodes, which are embedded in the display panel, during a touch mode period and simultaneously applying a second electrode driving signal to a second electrode, which is positioned outside the display panel, such that a touch position and a touch force are simultaneously sensed with regard to a single touch.

According to another aspect, the present embodiments may provide a driving circuit including: a signal generating circuit configured to generate and output a first electrode driving signal; a first electrode driving circuit configured to apply a display driving voltage to multiple first electrodes, which are embedded in a display panel, during a display mode period and to successively apply the first electrode driving signal to at least one of the multiple first electrodes during a touch mode period; and a second electrode driving circuit configured to apply a second electrode driving signal to a second electrode, which is positioned outside the display panel, during the touch mode period.

According to another aspect, the present embodiments may provide a method for driving a touch display device, including: driving a display panel during a display mode period; successively applying a touch driving signal to at least one of multiple first electrodes, which are embedded in the display panel, during a touch driving period, thereby sensing a touch position with regard to a touch; and applying a first force driving signal to all or some of the multiple first electrodes, during a force driving period, and simultaneously applying a second force driving signal to the second electrode, thereby sensing a touch force with regard to the touch.

According to another aspect, the present embodiments may provide a driving circuit including: a signal generating circuit configured to generate and output a touch driving signal and a first force driving signal; a first electrode driving circuit configured to apply a display driving voltage to multiple first electrodes, which are embedded in a display panel, during a display mode period, configured to successively apply the touch driving signal to at least one of the multiple first electrodes during a touch driving period, configured to receive an input of the first force driving signal during a force driving period, and configured to apply the first force driving signal to all or some of the multiple first electrodes; and a second electrode driving circuit configured to apply a second force driving signal to a second electrode, which is positioned outside the display panel, during the force driving period.

According to another aspect, the present embodiments may provide a driving circuit configured to apply a display driving voltage to multiple first electrodes, which are embedded in a display panel, during a display mode period, configured to successively apply a touch driving signal to at least one of the multiple first electrodes during a touch driving period, and configured to apply a first force driving signal to all or some of the multiple first electrodes during a force driving period.

As described above, the present embodiments may provide a touch display device, a method for driving the same, and a driving circuit, the touch display device being structured such that it cannot only sense the coordinate (position) of a touch generated by the user, but also sense the touch force, with which the user presses the screen during the touch, in order to provide various functions in various types.

The present embodiments may provide a driving circuit, a touch display device, and a method for driving the same, which enable simultaneous proceeding of driving for sensing a touch position and driving for sensing a touch force during a touch mode period.

The present embodiments may provide a driving circuit, a touch display device, and a method for driving the same, which enable separate proceedings of driving for sensing a touch position and driving for sensing a touch force during a touch mode period.

The present embodiments may provide a driving circuit, a touch display device, and a method for driving the same, which can recognize the position of occurrence of a touch force, i.e. a force with which the user's touch presses the screen.

The present embodiments may provide a driving circuit, a touch display device, and a method for driving the same, which can accurately distinguish between a soft touch, i.e. the force with which the user's touch presses the screen does not exist or is equal to or less than a predetermined level, and a force touch, i.e. the force with which the user's touch presses the screen exists or exceeds the predetermined level.

The present embodiments may provide a touch display device including a display panel, on which multiple first electrodes are arranged, a second electrode positioned outside the display panel, and a touch force sensing gap, which exists between the multiple first electrodes and the second electrode, and which can change its size according to a touch force such that touch force sensing is possible.

BRIEF DESCRIPTION OF THE DRAWINGS

The above and other objects, features and advantages of the present invention will be more apparent from the following detailed description taken in conjunction with the accompanying drawings, in which:

FIG. 3 and FIG. 4 are diagrams illustrating a principle of sensing by a touch display device according to the present embodiments;

FIG. 13 to FIG. 18 are diagrams illustrating examples of a force sensing structure of a touch display device according to the present embodiments;

FIG. 19 is a diagram illustrating two driving types (driving type A and driving type B) related to a touch mode period, between two operation modes of a touch display device according to the present embodiments;

FIG. 20C illustrates exemplary fourth combinations of a first electrode driving signal, which is applied to a first electrode, and a second electrode driving signal, which is applied to a second electrode, when a driving circuit of a touch display device according to the present embodiments simultaneously conducts driving for sensing a touch position and driving for sensing a touch force;

FIG. 22D and FIG. 22E illustrate exemplary eight combinations of a first force driving signal, which is applied to a first electrode, and a second force driving signal, which is applied to a second electrode, during a force driving period in a touch mode period, given that a driving circuit of a touch display device according to the present embodiments separately conducts driving for sensing a touch position and driving for sensing a touch force;

DETAILED DESCRIPTION OF THE EXEMPLARY EMBODIMENTS

Figure 1:
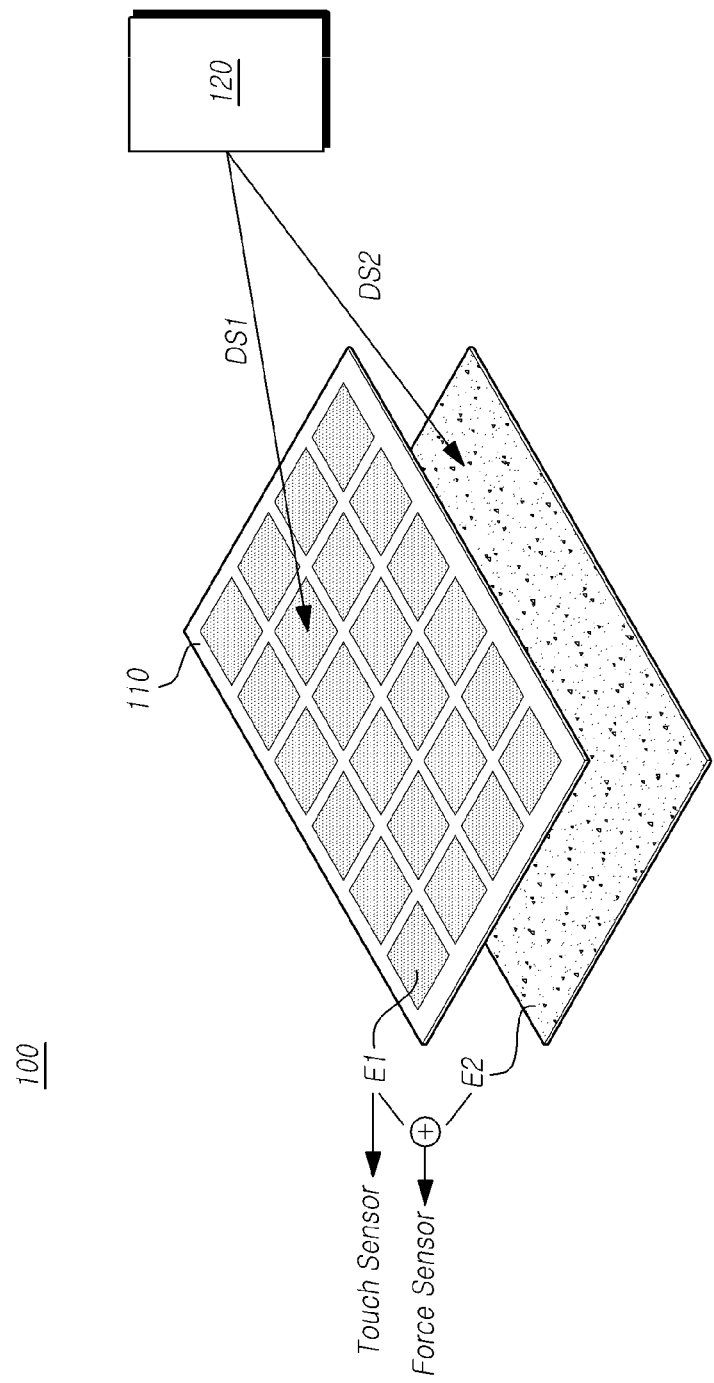
FIG. 1 is a diagram illustrating a schematic configuration of a touch display device according to the present embodiments.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

Figure 2:
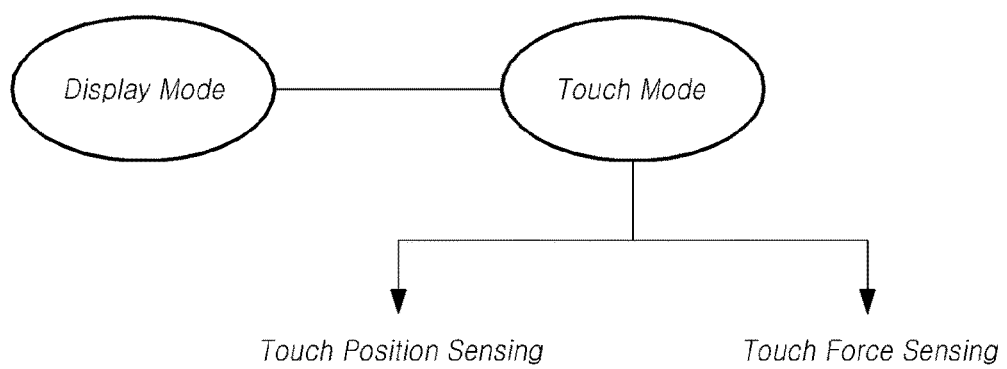
FIG. 2 is a diagram illustrating an operation mode of a touch display device according to the present embodiments.

FIG. 1 is a diagram illustrating a schematic configuration of a touch display device 100 according to the present embodiments, and FIG. 2 is a diagram illustrating an operation mode of the touch display device 100 according to the present embodiments.

Referring to FIG. 1 and FIG. 2, the touch display device 100 according to the present embodiments may operate in a display mode for displaying images, or may operate in a touch mode for sensing the user's touch.

The touch display device 100 according to the present embodiments, when operating in the display mode, drives data lines and gate lines, which are arranged on a display panel 110, thereby displaying images.

The touch display device 100 according to the present embodiments, when operating in the touch mode, cannot only provide a touch position sensing function, with regard to a touch generated by a finger, a pen, or the like, for determining whether a touch has occurred or not and for sensing the touch position, but can also provide a touch force sensing function for sensing a touch force (also simply referred to as "a force"), which corresponds to the force (pressure) applied during the touch.

As used in the present specification, a touch refers to an action of the user contacting the display panel 110 by a pointer.

Such touches may be classified into soft touches, i.e. the force (pressure) with which the display panel 110 is pressed is absent or is equal to or less than a predetermined level, and force touches, i.e. the force (pressure) with which the display panel 110 is pressed exists or exceeds the predetermined level.

A touch position (also referred to as "a touch coordinate") resulting from such a touch (soft touch or force touch) refers to the position of the point at which the user has touched the display panel 110.

In addition, a touch force resulting from such a touch (force touch) refers to the force (pressure) with which the user presses the display panel 110 during the touch.

On the other hand, the pointer by which the user touches the screen may be a part of the human body, such as a finger, or a conductor point, such as a pen having a contact portion made of a conductor, and, in some cases, may be a nonconductor pointer, such as a pen having a contact portion made of a nonconductor.

A pointer for enabling sensing of a touch position needs to be a conductor pointer. In contrast, a pointer for enabling sensing of a touch force may be either a conductor pointer or a nonconductor pointer.

Referring to FIG. 1 and FIG. 2, the touch display device 100 according to the present embodiments may include multiple first electrodes E1, which are necessary to sense a touch position (which is a concept including whether a touch occurs or not), a second electrode E2 for sensing a touch force, a driving circuit 120 for driving the multiple first electrodes E1 and the second electrode E2, thereby sensing a touch position and a touch force, and the like.

The multiple first electrodes E1 are electrodes used to sense a touch position, and are also referred to as "touch sensors" or "touch electrodes".

The multiple first electrodes E1 may be arranged on a touch screen panel, which is separate from the display panel 110, or may be embedded and arranged in the display panel 110.

When the multiple first electrodes E1 are embedded and arranged in the display panel 110, the display panel 110 may be referred to as "a touch screen panel-integrated display panel", which has multiple first electrodes E1 embedded therein.

On the other hand, the second electrode E2 is an electrode used to sense a touch force, which corresponds to a force (pressure) applied during a touch.

The second electrode E2 may be positioned on the outer portion (for example, lower portion, upper portion, side surface, or the like) of the display panel 110.

On the other hand, the touch display device 100 according to the present embodiments may successive drive the multiple electrodes E1, in order to sense a touch position, and may grasp a change in capacitance between each first electrode E1 and the pointer on the basis of a signal received from each first electrode E1, thereby sensing a touch position.

In order to sense a touch force, in contrast, the touch display device 100 according to the present embodiments needs to drive the multiple first electrodes E1 and the second electrode E2 simultaneously.

In other words, in order to sense a touch position, the driving circuit 120 of the touch display device 100 according to the present embodiments successively applies a first electrode driving signal DS1 to the multiple first electrodes E1, thereby successively driving the multiple first electrodes E1.

In the present specification, the first electrode driving signal DS1, which is applied to the first electrodes E1 in order to sense a touch position, is also referred to as "a touch driving signal TDS".

In order to sense a touch force, furthermore, the driving circuit 120 of the touch display device 100 according to the present embodiments applies a first electrode driving signal DS1 to the multiple first electrodes E1 and simultaneously applies a second electrode driving signal DS2 to the second electrode E2, thereby driving the multiple first electrodes E1 and the second electrode E2 simultaneously.

In the present specification, the first electrode driving signal DS1, which is applied to the first electrodes E1 in order to sense a touch force, is also referred to as "a first force driving signal FDS1", and the second electrode driving signal DS2, which is applied to the second electrode E2, is also referred to as "a second force driving signal FDS2".

Given that the multiple first electrodes E1 and the second electrode E2 are driven simultaneously in order to sense a touch force, the multiple first electrodes E1, which are embedded in the display panel 110, and the second electrode E2, which is positioned on the outer portion of the display panel 110, may be referred to as "a force sensor" as a whole.

On the other hand, the multiple first electrodes E1 can not only operate as a touch sensor and a force sensor during a touch mode period, but can also operate as a kind of display driving electrodes, to which a display driving voltage is applied, during a display mode period.

For example, the multiple first electrodes E1 may be common electrodes, to which a common voltage Vcom is applied, during a display mode period, the common voltages Vcom corresponding to a display driving voltage.

When the multiple first electrodes E1 are also used as display driving electrodes as such, the multiple first electrodes E1 play triple roles of a touch sensor, a force sensor, and display driving electrodes.

FIG. 3 and FIG. 4 are diagrams illustrating a principle of sensing by a touch display device 100 according to the present embodiments.

FIG. 3 is a diagram illustrating sensing operations in connection with three touch types (Case 1, Case 2, and Case 3) according to the kind of the pointer and whether a touch force exists or not, and FIG. 4 is a diagram illustrating a sensing principle according to the three touch types.

Referring to FIG. 3, the touch types may include Case 1 that corresponds to a soft touch, which is generated by a pointer that has a contact portion made of a conductor, and which is generated by a pressing force equal to or less than a predetermined level; Case 2 that corresponds to a force touch, which is generated by a pointer that has a contact portion made of a conductor, and which is generated by a force that exceeds the predetermined level; and Case 3 that corresponds to a force touch, which is generated by a pointer that has a contact portion made of a nonconductor, and which is generated by a force that exceeds the predetermined level.

Referring to FIG. 3 and FIG. 4, the driving circuit 120 successively applies a first electrode driving signal DS1 to the multiple first electrodes E1, during a touch mode period, and applies a second electrode driving signal DS2 to the second electrode E2, thereby performing driving for sensing a touch position and a touch force.

According to the driving by the driving circuit 120 during the touch mode period, a first capacitance C1 may be formed between the first electrodes E1 and the pointer that corresponds to the first type, or a second capacitance C2 may be formed between the first electrodes E1 and the second electrode E2.

The first capacitance C1 formed between the first electrodes E1 and the pointer may vary according to whether a touch is generated or not.

The second capacitance C2 formed between the first electrodes E1 and the second electrode E2 may vary according to whether a touch force exists or not (magnitude thereof).

Therefore, the driving circuit 120 may grasp a change in magnitude of the first capacitance C1, on the basis of signals received from respective first electrodes E1, and a change in magnitude of each second capacitance C2, may sense a touch position on the basis of the change in magnitude of the first capacitance C1, and may sense a touch force on the basis of the change in magnitude of the second capacitance C2.

Referring to FIG. 3 and FIG. 4, the touch display device 100 may be structured, in order to enable a touch force sensing, such that a capacitor is formed between the multiple first electrodes E1 and the second electrode E2, and at least one touch force sensing gap G, which can change its size according to whether a touch force exists or not, exists between the multiple first electrodes E1 and the second electrode E2.

In this regard, the touch force sensing gap G may be, for example, a dielectric substance gap or an air gap. Hereinafter, the touch force sensing gap G will be simply referred to as a "gap G".

When a force touch occurs at a point, the size of the touch force sensing gap G varies in the vertical direction. This changes the magnitude of the second capacitance C2 between the first electrodes E1 and the second electrode E2, and it is possible to perform a touch force sensing function of sensing a touch force on the basis of such a change in magnitude of the second capacitance C2.

In this regard, the result of touch force sensing may include information regarding whether a touch force exists or not, and may include information regarding the magnitude of the touch force.

As described above, structurally providing a touch force sensing gap G, which can change its size, between the first electrodes E1 and the second electrode E2 enables touch force sensing.

The touch display device 100 according to the present embodiments can sense a touch force in a capacitance type, in the same manner of sensing a touch position (touch coordinate).

In other words, the touch display device 100 according to the present embodiments is peculiar in that, in order to sense a touch force (pressing force) of a touch, the same does not solely employ a dedicated pressure sensor as in the conventional pressure sensing scheme, but uses both the second electrode E2, which is positioned on the outer portion of the display panel 110 for the purpose of touch force sensing, and the multiple first electrodes E1, which are embedded in the display panel 110 for the purpose of touch coordinate calculation, thereby sensing a touch force in a capacitance type.

As described above, even if the driving circuit 120 drives the first electrodes E1 and the second electrode E2 in the same manner during a touch mode period, the sensed information may differ depending on the touch type.

For example, in connection with Case 1 illustrated in FIG. 3 and FIG. 4, in the case of a first touch type corresponding to a soft touch, which is generated by a pointer that has a contact portion made of a conductor, and which is generated by a pressing force equal to or less than a predetermined level, the driving circuit 120, after driving the first electrodes E1 and the second electrode E2, may solely sense a touch position, with regard to the touch, on the basis of a signal received from each first electrode E1.

This is because, in the case of a first touch type corresponding to a soft touch, which is generated by a pointer that has a contact portion made of a conductor, and which is generated by a pressing force equal to or less than a predetermined level, there occurs a change in magnitude of the first capacitance C1 with the pointer for each first electrode E1, but there occurs no change in magnitude of the second capacitance C2 between the first electrodes E1 and the second electrode E2, making it possible to sense a touch position only.

As another example, in connection with Case 2 illustrated in FIG. 3 and FIG. 4, in the case of a first touch case corresponding to a soft touch, which is generated by a pointer that has a contact portion made of a conductor, and which is generated by a pressing force equal to or less than a predetermined level, the driving circuit 120 can simultaneously sense a touch position and a touch force, with regard to the touch, on the basis of a signal received from each first electrode E1.

This is because, in the case of the second touch type corresponding to a force touch, which is generated by a pointer that has a contact portion made of a conductor, and which is generated by a pressing force exceeding a predetermined level, there occurs a change in magnitude of the first capacitance C1 with the pointer for each first electrode E1, and there also occurs a change in magnitude of the second capacitance C2 between the first electrodes E1 and the second electrode E2, making it possible to sense both a touch position and a touch force with regard to a single touch.

As another example, in connection with Case 3 illustrated in FIG. 3 and FIG. 4, in the case of a third touch type corresponding to a force touch, which is generated by a pointer that has a contact portion made of a nonconductor, and which is generated by a pressing force that exceeds the predetermined level, the driving circuit 120 can solely sense a touch force, with regard to the touch, on the basis of a signal received from each first electrode E1.

This is because, in the case of the third touch type corresponding to a force touch, which is generated by a pointer that has a contact portion made of a nonconductor, and which is generated by a pressing force that exceeds the predetermined level, there occurs no change in the first capacitance C1 with the pointer for each electrode E1, but there occurs a change in magnitude of the second capacitance C2 between the first electrodes E1 and the second electrode E2, making it possible to solely sense a touch force only with regard to a single touch.

As described above, the touch display device 100 has a gap structure between the first electrodes E1 and the second electrode E2, and performs sensing processing on the basis of signals received through the first electrodes E1; as a result, even if the first electrodes E1 and the second electrode E2 are driven in the same manner during a touch mode period, regardless of the kind of the touch type, and even if signal detection and sensing processing are performed in the same manner, it is possible to obtain sensing information conforming to the touch type.

Hereinafter, a first electrode driving signal DS1 and a second electrode driving signal DS2, which are for the purpose of touch driving during a touch mode period, will be described.

The first electrode driving signal DS1, which is applied to the first electrodes E1 during a touch mode period, may be regarded as a touch driving signal in terms of a touch sensing function for sensing a touch position, and may also be regarded as a force driving signal in terms of a force sensing function for sensing a touch force.

The second electrode driving signal DS2, which is applied to the second electrode E2 during the touch mode period, may be regarded as a force driving signal in terms of a force sensing function for sensing a touch force.

During a touch mode period, during which the touch display device 100 according to the present embodiments operates in a touch mode, the touch position and the touch force may be sensed simultaneously or may be sensed independently through driving in different periods, respectively.

Figure 5:
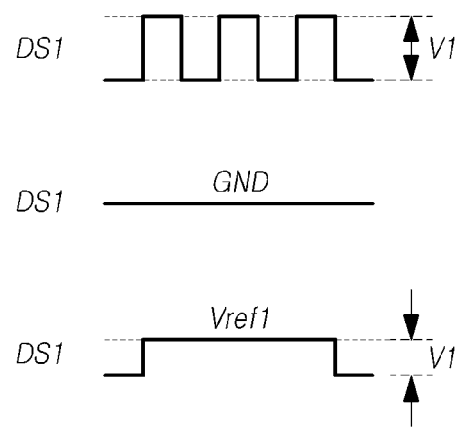
FIG. 5 illustrate exemplary first electrode driving signals for driving a first electrode in connection with a touch display device according to the present embodiments.
Figure 6:
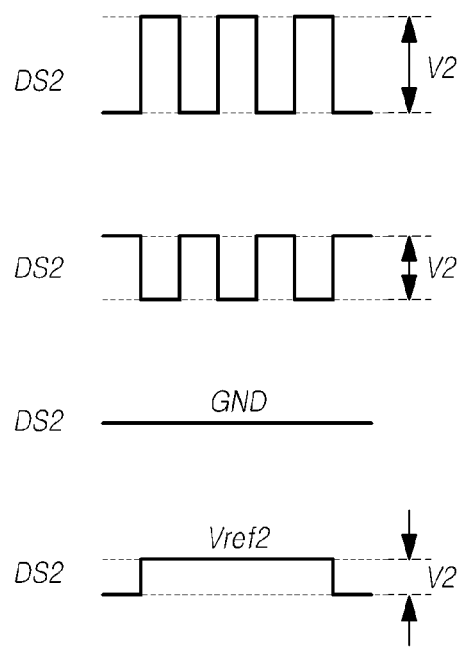
FIG. 6 illustrates exemplary second electrode driving signals for driving a second electrode in connection with a touch display device according to the present embodiments.

FIG. 5 illustrate exemplary first electrode driving signals DS1 for driving the first electrodes E1, in connection with a touch display device 100 according to the present embodiments, and FIG. 6 illustrates exemplary second electrode driving signals DS2 for driving the second electrode E2, in connection with the touch display device 100 according to the present embodiments.

Referring to FIG. 5, the first electrode driving signal DS1 may be a pulse-type signal having a predetermined frequency, a predetermined amplitude, and a predetermined phase, and may be a signal having a DC voltage.

When the first electrode driving signal DS1 is a pulse-type signal, the amplitude thereof may be a first voltage V1.

When the first electrode driving signal DS1 is a signal having a DC voltage, the DV voltage may be a ground voltage GND or a first reference voltage Vref1, which is not the ground voltage GND. In this regard, the first reference voltage Vref1 may be, for example, a common voltage Vcom.

Referring to FIG. 6, the second electrode driving signal DS2 may be a pulse-type signal having a predetermined frequency, a predetermined amplitude, and a predetermined phase, and may be a signal having a DC voltage.

When the second electrode driving signal DS2 is a pulse-type signal, the amplitude thereof may be a second voltage V2.

The frequency of the second electrode driving signal DS2 is identical to the frequency of the first electrode driving signal DS1.

However, the phase of the second electrode driving signal DS2 may be identical to the phase of the first electrode driving signal DS1, or may have a phase difference of 180°.

When the first electrode driving signal DS1 and the second electrode driving signal DS2 have the same phase, the first electrode driving signal DS1 and the second electrode driving signal DS2 are described as having an equiphase relationship.

When the first electrode driving signal DS1 and the second electrode driving signal DS2 have a phase difference of 180°, the first electrode driving signal DS1 and the second electrode driving signal DS2 are described having a reverse-phase relationship.

When the first electrode driving signal DS1 is a signal having a DC voltage, the DV voltage may be a ground voltage GND or a second reference voltage Vref2, which is not the ground voltage GND. In this regard, the second reference voltage Vref2 may be, for example, a common voltage Vcom.

The first reference voltage Vref1 and the second reference voltage Vref2 may be identical or different.

It is possible to properly combine and use the exemplary first electrode driving signals DS1 and the second electrode driving signals DS2, which are illustrated in FIG. 5 and FIG. 6, according to the driving scheme in the touch mode period.

Figure 7:
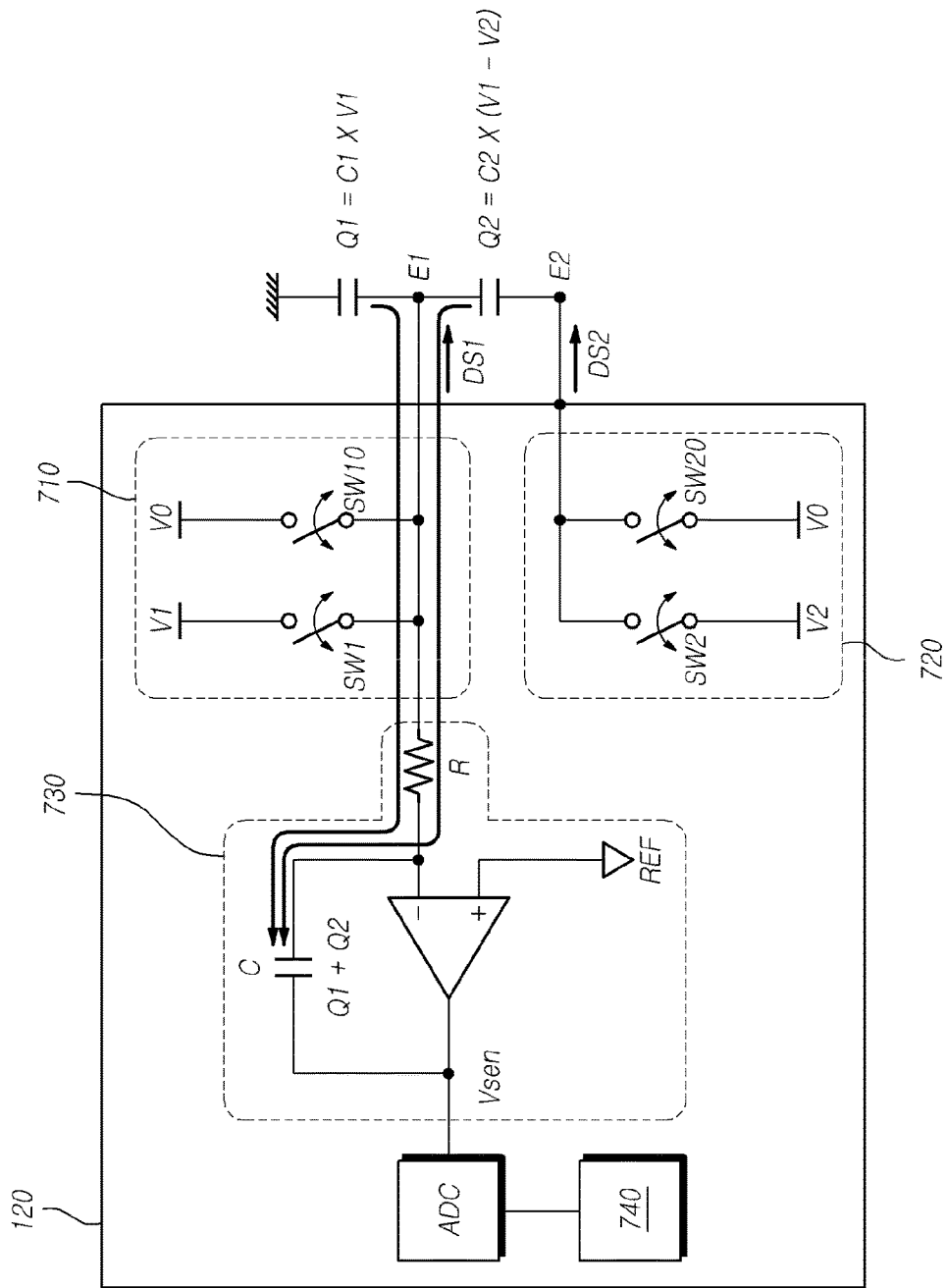
FIG. 7 is a diagram illustrating an exemplary driving circuit of a touch display device according to the present embodiments.

FIG. 7 is a diagram illustrating a driving circuit 120 of the touch display device 100 according to the present embodiments.

As illustrated in FIG. 7, the driving circuit 120 may include a first electrode driving signal supply unit 710, a second electrode driving signal supply unit 720, an integrator 730, and the like.

The first electrode driving signal supply unit 710 may supply a first electrode driving signal DS1, which has one of signal waveforms illustrated in FIG. 5, to a first electrode E1 through on-off control of two switches SW1 and SW10.

The second electrode driving signal supply unit 720 may supply a second electrode driving signal DS2, which has one of signal waveforms illustrated in FIG. 6, to a second electrode E2 through on-off control of two switches SW2 and SW20.

The integrator 710 may include an operation amplifier OP-AMP, a capacitor C, a resistor R, and the like, and may output an integration value with regard to an input of an input stage, which is electrically connected to the first electrode E1.

The driving circuit 120 may further include an analog-digital converter ADC configured to convert the output value from the integrator 730 to a digital value, a processor 740 configured to perform touch position calculation, touch force recognition, and the like on the basis of the digital value output from the analog-digital converter ADC, and the like.

In this regard, at least one of the analog-digital converter ADC and the processor 740 may be positioned outside the driving circuit 120.

The circuit configuration of the driving circuit 120 illustrated in FIG. 7 is only an example for convenience in description, and may be implemented in various other types.

Referring to FIG. 7, the driving circuit 120 applies a first electrode driving signal DS1 to the first electrode E1 during driving in the touch mode period, applies a second electrode driving signal DS2 to the second electrode E2, and then converts a value Vsen, which is obtained by integrating a signal received from the first electrode E1 through the integrator 730, to a digital value.

It is possible to sense at least one of a touch position and a touch force by grasping the amount of charging (or voltage) or a change thereof, which depends on whether a touch exists or not, whether a touch force exists or not, and the like, on the basis of the digital value with regard to each first electrode E1.

Referring to FIG. 7, the signal (input to the integrator 730) received from the first electrode E1 corresponds to the combined amount of electrical charges Q1+Q2 that is the sum of the amount of electrical charge Q1, which charges the capacitor between the pointer and the first electrode E1, and the amount of electrical charge Q2, which charges the capacitor between the first electrode E1 and the second electrode E2.

Depending on driving in the touch mode period, the amount of electrical charge Q1, which charges the capacitor between the pointer and the first electrode E1, may be determined by the first capacitance C1 and by the voltage V1 of the first electrode driving signal DS1. The amount of electrical charge Q2, which charges the capacitor between the first electrode E1 and the second electrode E2, may be determined by the second capacitance C2, by the voltage V1 of the first electrode driving signal DS1, and by the voltage V2 of the second electrode driving signal DS2.

The amount of electrical charge Q1, which charges the capacitor between the pointer and the first electrode E1, and the amount of electrical charge Q2, which charges the capacitor between the first electrode E1 and the second electrode E2, may be expressed by equation (1) below:

$$Q1 = C1 \times V1$$
$$Q2 = C2 \times (V1 - V2) \qquad \text{Equation (1)}$$

The combined amount of electrical charges Q1+Q2 charges the capacitor C inside the integrator 730, and is output from the integrator 730 as a sensing voltage value Vsen.

Accordingly, the analog-digital converter ADC converts the sensing voltage value Vsen to a digital value.

The processor 740 may sense at least one of the touch position and the touch force on the basis of the digital value (sensing value) output from the analog-digital converter ADC.

On the other hand, when a touch force is sensed, a predetermined application or a function may be executed so as to correspond to the touch force.

Alternatively, when a touch force is sensed, a predetermined application or a function may be executed so as to correspond to the magnitude of the touch force.

Figure 8:
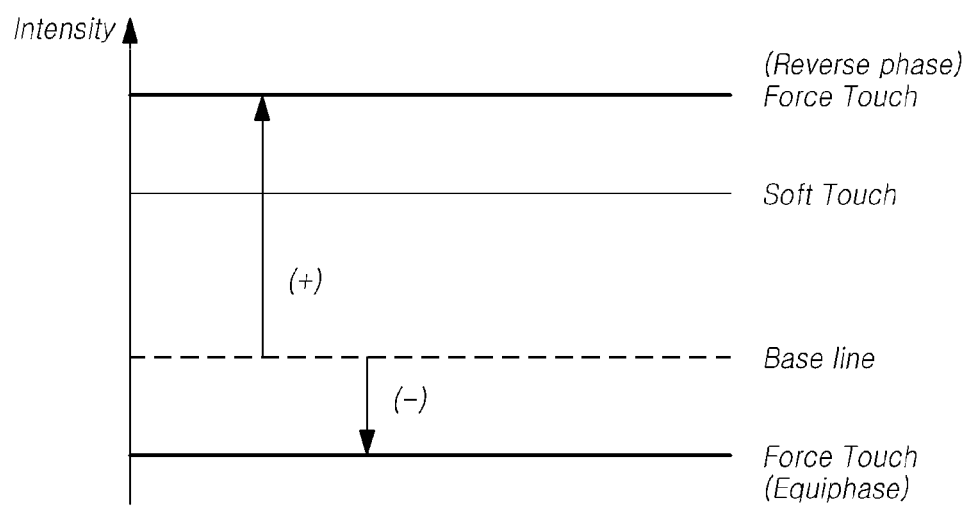
FIG. 8 is a diagram illustrating the intensity of a received signal, which results from a soft touch, and the intensity of a received signal, which results from a force touch, in connection with a touch display device according to the present embodiments.

FIG. 8 is a diagram illustrating the intensity of a received signal, which results from a soft touch, and the intensity of a received signal, which results from a force touch, in connection with a touch display device 100 according to the present embodiments.

It has been assumed in connection with FIG. 8 that the first electrode driving signal DS1 and the second electrode driving signal DS2 are pulse-type signals as illustrated in FIG. 6A and FIG. 6B.

Referring to FIG. 8, the signal intensity of a signal received from the first electrode E1 can be confirmed from a digital value output from the analog-digital converter ADC.

Referring to FIG. 8, a digital value output from the analog-digital converter ADC when the pressing force does not exist or is equal to or less than a predetermined level has a value in the positive (+) direction, with reference to a digital value output from the analog-digital converter ADC when there is no touch at all (baseline).

Referring to FIG. 8, assuming that the first electrode driving signal DS1 and the second electrode driving signal DS2 have an equiphase relationship, a digital value output from the analog-digital converter ADC when a pressing force generated by a pointer having a contact portion made of a nonconductor exists or exceeds a predetermined level (i.e. when a force touch occurs) has a value in the negative (−) direction with reference to the baseline.

Referring to FIG. 8, assuming that the first electrode driving signal DS1 and the second electrode driving signal DS2 have a reverse-phase relationship, a digital value output from the analog-digital converter ADC when a pressing force generated by a pointer having a contact portion made of a nonconductor exists or exceeds a predetermined level (i.e. when a force touch occurs) has a value in the positive (+) direction with reference to the baseline.

Figure 9A:
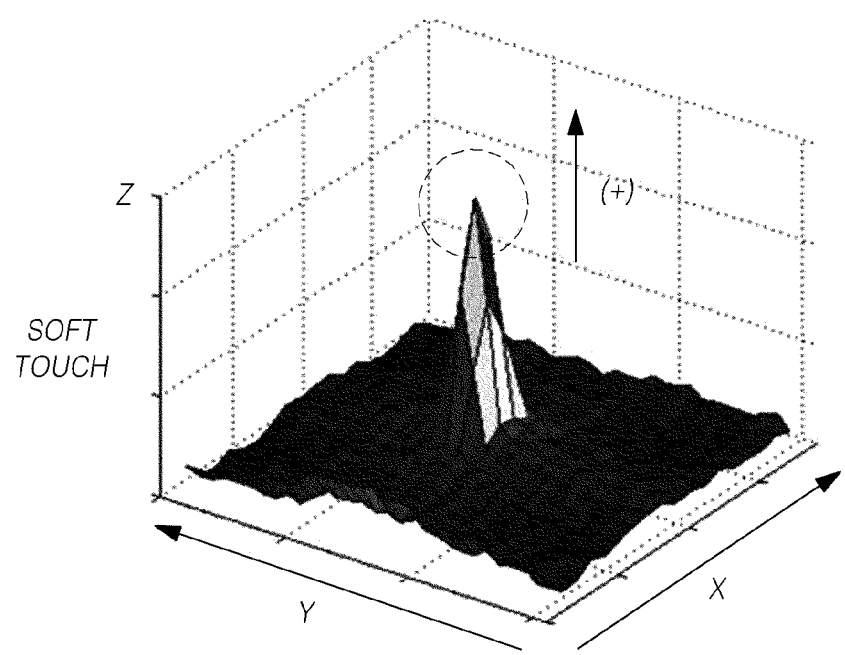
FIG. 9A and FIG. 9B are diagrams illustrating the distribution of the intensity of a received signal, which results from a soft touch, and the intensity of a received signal, which results from a force touch, in connection with a touch display device according to the present embodiments.
Figure 9B:
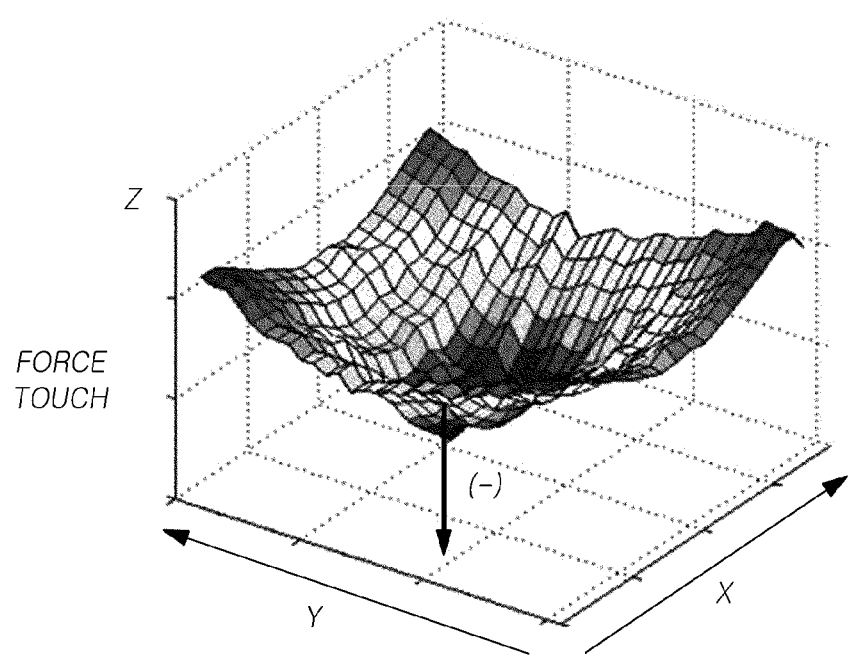

FIG. 9A and FIG. 9B are diagrams illustrating the distribution of the intensity of a received signal, which results from a soft touch, and the intensity of a received signal, which results from a force touch, in connection with a touch display device 100 according to the present embodiments.

FIG. 9A and FIG. 9B are diagrams illustrating the distribution of the intensity of a received signal, which results from a soft touch, and the intensity of a received signal, which results from a force touch, in the entire area (XY plane) of a touch display device 100 according to the present embodiments.

Referring to FIG. 9A, in view of the entire area of the display panel 110, when a soft touch occurs at a specific point, the magnitude of the digital value output from the analog-digital converter ADC (signal intensity) has such an overall distribution, with reference to the baseline, that the signal intensity increases in the positive (+) direction of z-axis.

In connection with the signal intensity distribution when a soft touch occurred, furthermore, a large signal intensity may be distributed and concentrated at the point, at which the soft touch occurred, among the entire area of the screen (entire area of the display panel 110).

Referring to FIG. 9B, on the other hand, assuming that the second electrode E2 is a single plate electrode type, when a force touch occurs, the magnitude of the digital value output from the analog-digital converter ADC (signal intensity) has such an overall distribution that, with reference to the baseline, the signal intensity increases in the negative (−) direction of z-axis.

When a force touch occurred, furthermore, the distribution is as follows: the signal intensity is largest in the negative (−) direction at the screen center point, but the signal intensity has a gradual increase, starting from the outer periphery of the screen, towards the center point.

On the other hand, the stronger the force touch is, the larger the change in size of the gap G between the multiple first electrodes E1 and the second electrode E2; accordingly, the digital value output from the analog-digital converter ADC has a larger value in the negative (−) direction of z-axis with reference to the baseline. That is, the signal intensity increases in proportion to the intensity of the force touch.

Figure 10:
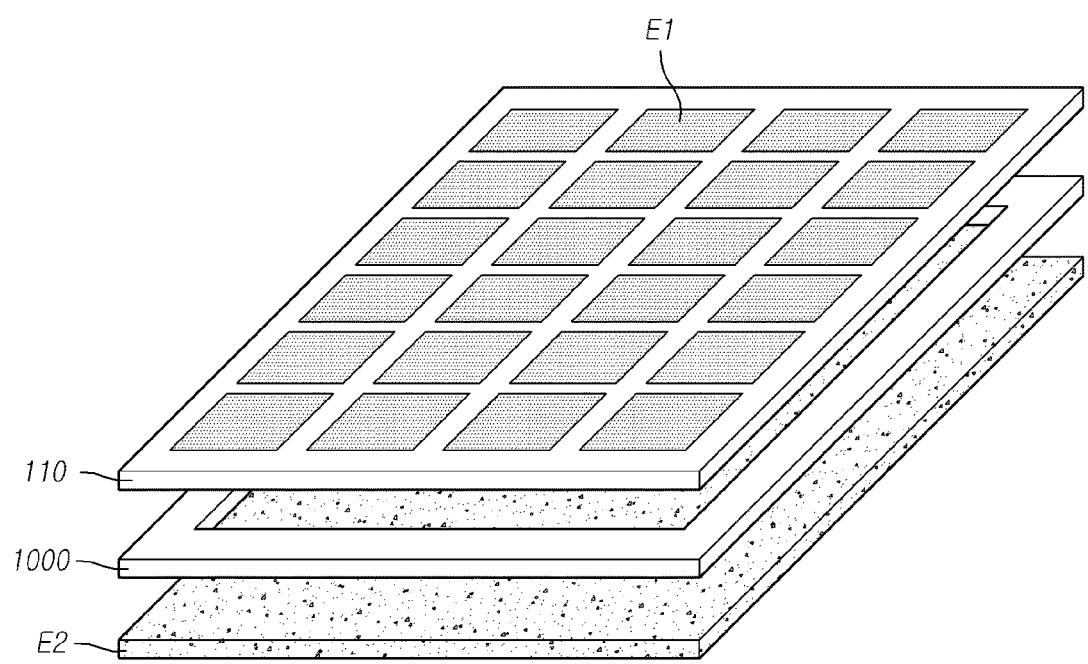
FIG. 10 and FIG. 11 are diagrams schematically illustrating a touch display device according to the present embodiments.
Figure 11:
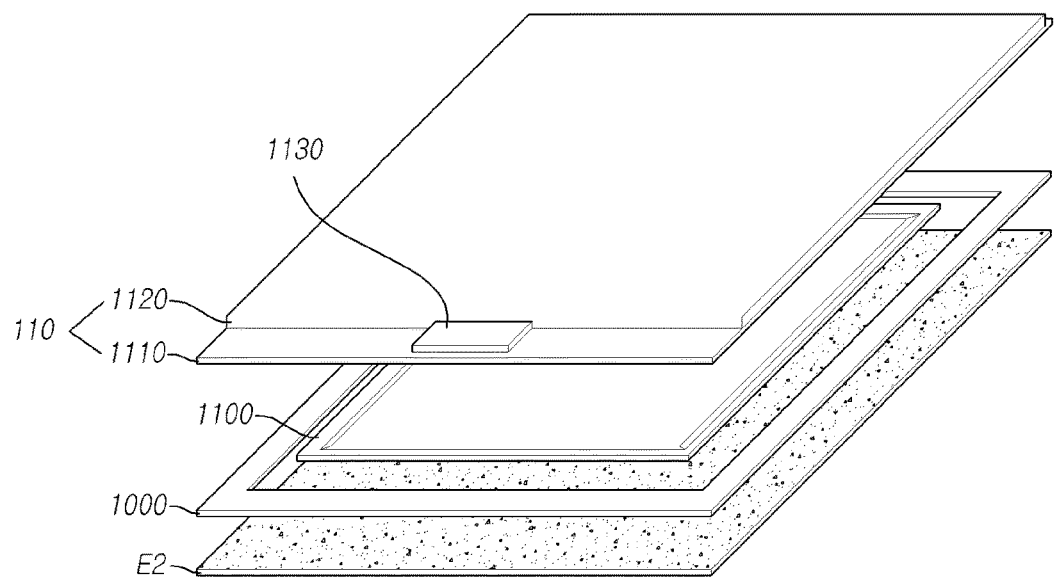

FIG. 10 and FIG. 11 are diagrams schematically illustrating a touch display device 100 according to the present embodiments.

Referring to FIG. 10, the touch display device 100 according to the present embodiments includes multiple first electrodes E1, which are arranged on a display panel 110, a second electrode E2, which is positioned on the outer portion of the display panel 110, and the like.

In order to sense a touch force, a gap G, which can change its size according to a force touch, needs to be provided between the multiple first electrodes E1 and the second electrode E2.

In order to generate a change in size of the gap G, which exists between the multiple first electrodes E1 and the second electrode E2, when a force touch occurs, the touch display device 100 according to the present embodiments may include a gap structure unit 1000, which generates a gap G between the multiple electrodes E1 and the second electrode E2, and which enables a change in size of the gap G according to a touch force.

Such a gap structure unit 1000 may be positioned beneath the display panel 110, for example, and may support the edge portion of the display panel 110.

Such a gap structure unit 1000 enables a change in size of the gap G between the multiple first electrodes E1 and the second electrode E2, when a force touch occurs, thereby enabling sensing of a touch force.

Referring to FIG. 11, the display panel 110 of the touch display device 100 according to the present embodiments may include a first substrate 1110, on which a TFT (Thin Film Transistor) and the like are arranged, and a second substrate 1120, on which a CF (Color Filter) and the like are arranged.

In addition, a driving chip 1130 may be mounted, bonded, or connected to the edge portion (non-active area) of the first substrate 1110.

In this regard, the driving chip 1130 may be a chip that implements all or part of the driving circuit 1200, may be a data driving chip, and, in some cases, may be a display driving chip that includes all or part of the data driving circuit and the driving circuit 120.

Referring to FIG. 11, a lower structure 1100 may be positioned beneath the display panel 110.

The second electrode E2 may be positioned beneath or inside the lower structure 1100.

The lower structure 1100 may be, for example, a backlight unit of a liquid crystal display device. In this case, the second electrode E2 may be positioned beneath the backlight unit.

This makes it possible to arrange the second electrode E2 without interfering with the light emitting function of the backlight unit.

The gap structure unit 1000 may be positioned beneath, inside, or on a side surface of the lower structure 1000.

In addition, the second electrode E2 may be positioned beneath or inside the gap structure unit 1000.

Various designs of the position of the second electrode E2 or the position of the gap structure unit 1000, as described above, make it possible to implement a touch force sensing structure suitable for the design structure of the display panel 110 and that of the touch display device 100.

Various types of gap structure units 1000, which can be applied to a liquid crystal device, will hereinafter be described assuming, for convenience of description, that a touch display device 1000 according to the present embodiments is a liquid crystal display device. In this connection, the positions of a first electrode E1 and of a second electrode E2, which are included in the touch display device 100, will be briefly described first.

Figure 12:
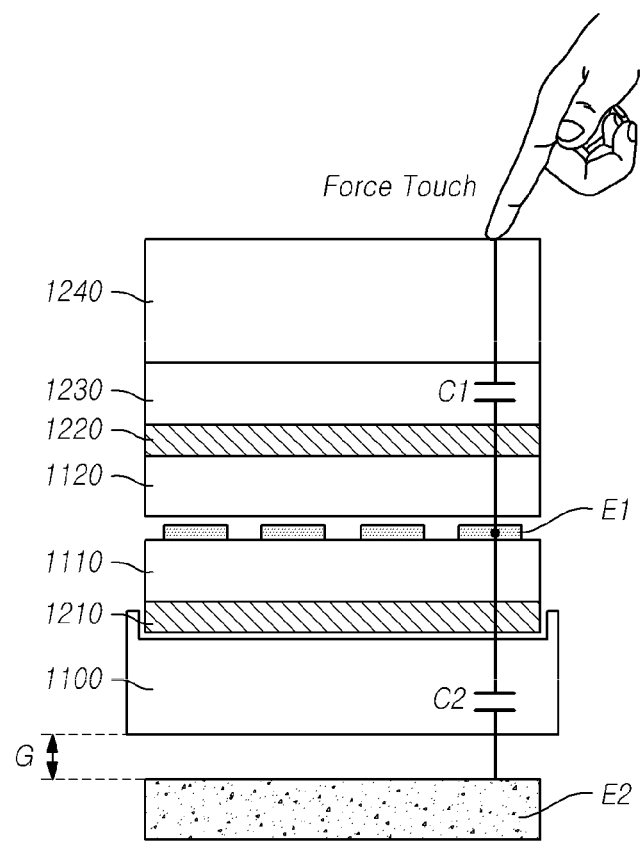
FIG. 12 is a sectional diagram of a touch display device according to the present embodiments.

FIG. 12 is a sectional diagram of a touch display device 100 according to the present embodiments.

Referring to FIG. 12, the display panel 110 includes a first polarization plate 1210, a first substrate 1110, multiple first electrodes E1, a second substrate 1120, a second polarization plate 1220, and the like.

A bonding layer 1230 and an upper cover 1240 are positioned on the display panel 110.

A lower structure 1100 is positioned beneath the display panel 110.

The lower structure 1100 may be a structure already existing in the touch display device 100, or a structure separately provided for the second electrode E2.

The lower structure 1100, for example, may be a backlight unit, a back cover, or the like of the liquid crystal display device. Besides, any structure is possible as long as it does not interfere with the electric field generated from the first electrodes E1 such that a capacitor can be formed between the first electrodes E1 and the second electrode E2.

Positioning the second electrode E2 beneath or inside the lower structure 1100, which corresponds to a backlight unit, as described above, can implement a force sensing structure adapted to the liquid crystal display device.

On the other hand, in the case of a liquid crystal display device, materials that interfere with formation of a second capacitance C2 between the first electrodes E1 and the second electrode E2 (for example, a layer of material such as silver (Ag), a reflection plate, a transparent electrode layer, and the like) should not exist.

Various examples of gap structure units 1000 will hereinafter be described.

FIG. 13 to FIG. 18 are diagrams illustrating examples of a gap structure unit 1000 of a touch display device 100 according to the present embodiments and changes in the gap size when a touch force occurs.

Figure 13:
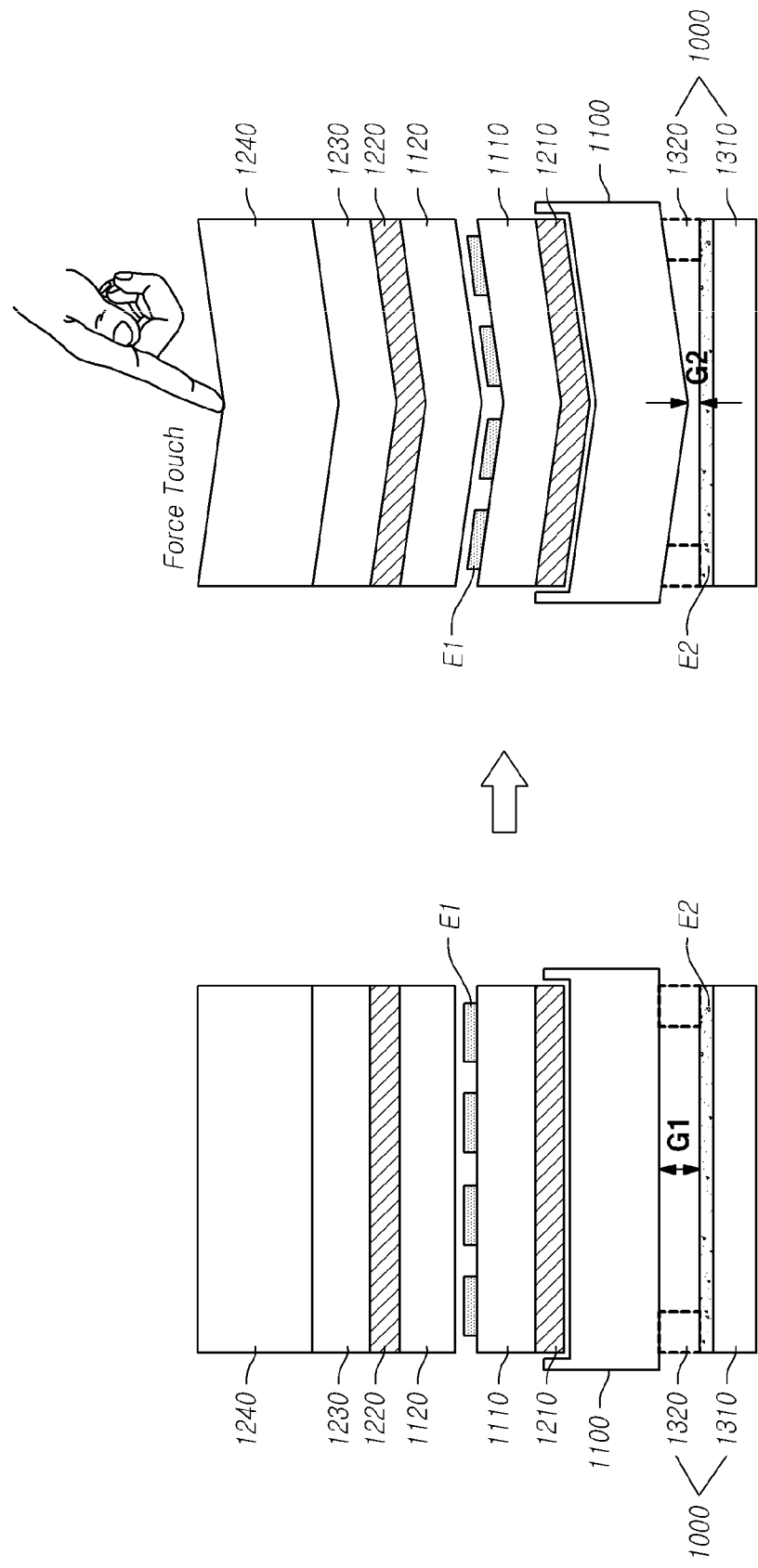

Referring to FIG. 13, the gap structure unit 1000 may include a base plate 1310 made of a substrate or a film, a spacer elastic pattern 1320 positioned between the upper surface edge of a second electrode E2, which is positioned on the base plate 1310, and the rear surface edge of a lower structure 1100, and the like.

The spacer elastic pattern 1320 may be attached, bonded, or coated on the rear surface of the lower structure 1100.

The spacer elastic pattern 1320 is made of an elastic material.

Referring to FIG. 13, when a force touch occurs, the upper cover 1240, the display panel 110, the lower structure 1100, and the like receive a downward force.

Accordingly, the touch force may change the size of the gap G between the non-edge portion of the upper surface of the second electrode E2 and the non-edge portion of the rear surface of the lower structure 1100.

Particularly, the gap G before occurrence of the force touch is G1, and the gap G after occurrence of the touch force is G2, which is smaller than G1.

Such a decrease of the gap G from G1 to G2, before and after occurrence of a force touch, changes the second capacitance C2 and enables recognition of the force touch.

The gap structure unit 1000 of FIG. 13 can increase the gap change and does not require modification of existing structures, such as the display panel 110 and the lower structure 1100, making it possible to easily implement a touch display device 100 capable of efficient force touch sensing.

Figure 14:
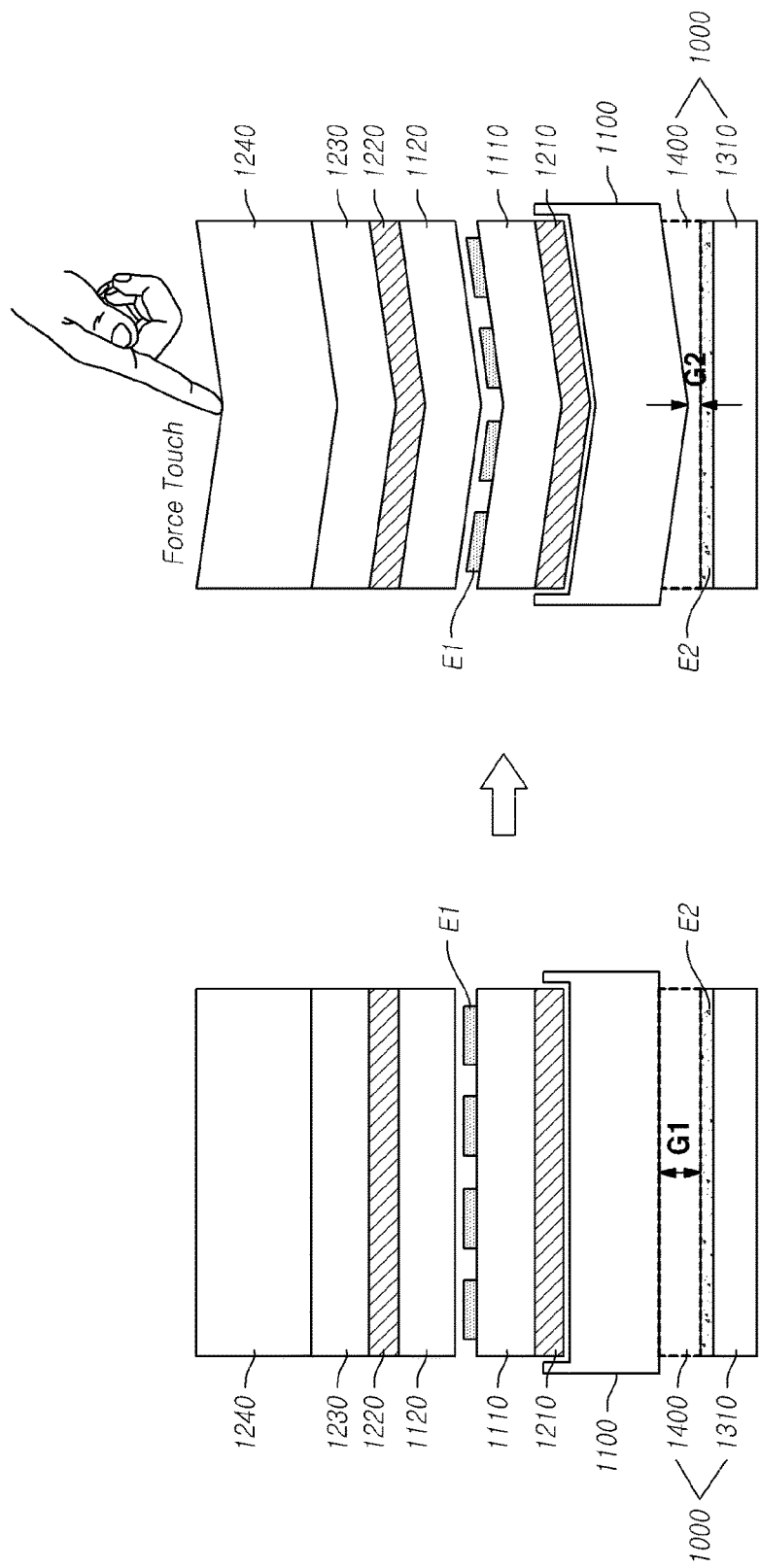

Referring to FIG. 14, the gap structure unit 1000 may include a base plate 1310 made of a substrate or a film, an elastic sheet 1400 positioned between the upper surface of a second electrode E2, which is positioned on the base plate 1310, and the rear surface of a lower structure 1100, and the like.

The elastic sheet 1400 may be attached, bonded, or coated on the rear surface of the lower structure 1100.

Referring to FIG. 14, when a force touch occurs, the upper cover 1240, the display panel 110, the lower structure 1100, and the like receive a downward force.

Accordingly, the touch force of the touch changes the thickness of the elastic sheet, and the size of the G between the upper surface of the second electrode E2 and the rear surface of the lower structure 1100 may change as a result.

Particularly, the gap G before occurrence of the force touch is G1, and the gap G after occurrence of the touch force is G2, which is smaller than G1.

Such a decrease of the gap G from G1 to G2, before and after occurrence of a force touch, changes the second capacitance C2 and enables recognition of the force touch.

The gap structure unit 1000 of FIG. 14 can be implemented to be thinner, and does not require modification of existing structures, such as the display panel 110 and the lower structure 1100, making it possible to easily implement a touch display device 100 capable of efficient force touch sensing with no significant change in size thereof.

Figure 15:
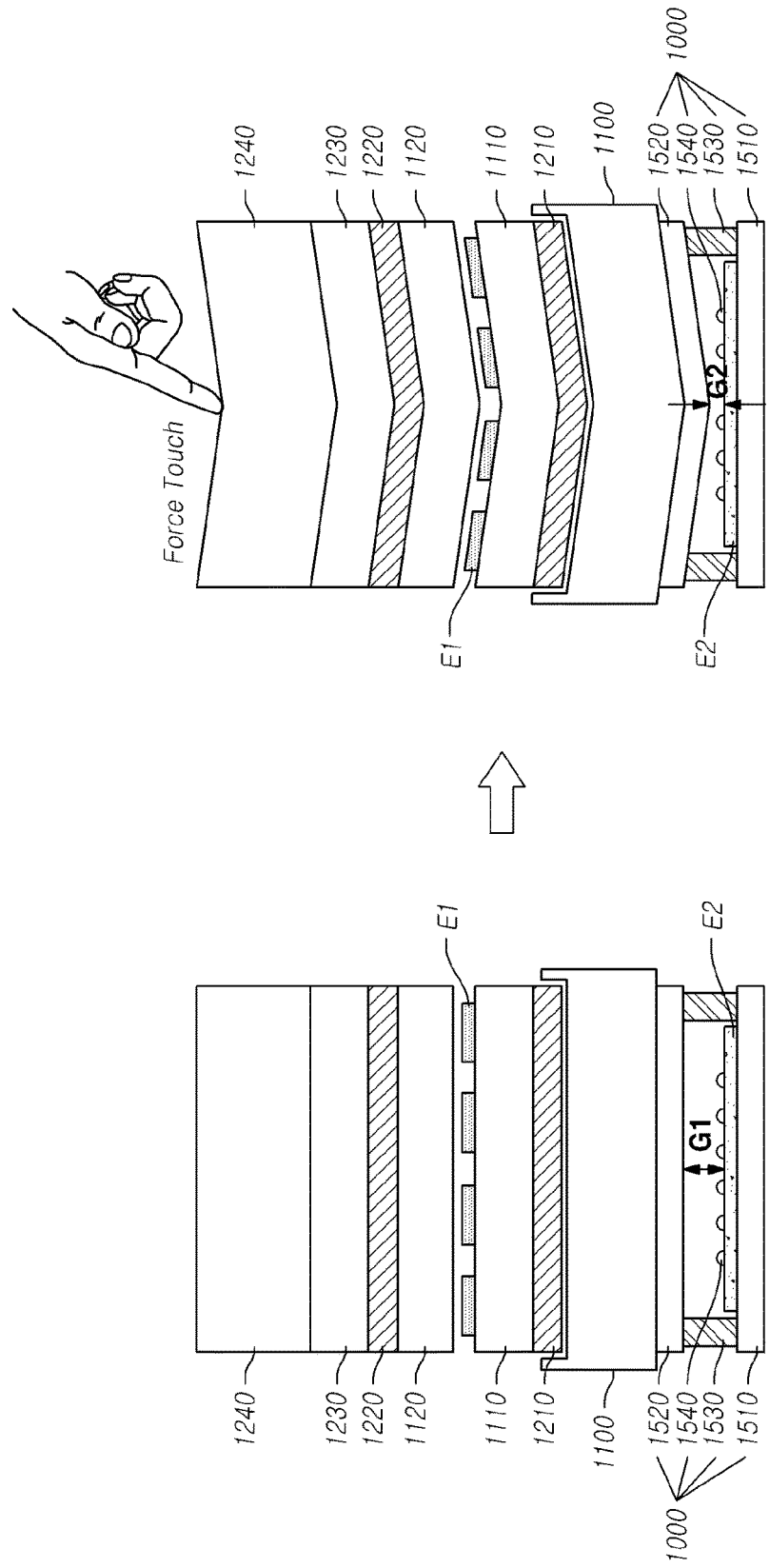

Referring to FIG. 15, the gap structure unit 1000 may include an upper film 1520 positioned on the rear surface of a lower structure 1100, a lower film 1510 facing the upper film 1520, a bonding agent 1530 bonded to the rear surface edge of the upper film 1520 and to the upper surface edge of the lower film 1510, and the like.

Referring to FIG. 15, a second electrode E2 may be positioned in an internal space provided by spacing between the non-edge portion of the rear surface of the upper film 1520 and the non-edge portion of the upper surface of the lower film 1510.

Referring to FIG. 15, a spacer 1540 may exist on the upper surface of the second electrode E2.

Referring to FIG. 15, when a force touch occurs, the upper cover 1240, the display panel 110, the lower structure 1100, and the like receive a downward force.

Accordingly, the size of the G between the upper surface of the second electrode E2 and the rear surface of the upper film 1520 may change according to the touch force of the touch.

Particularly, the gap G before occurrence of the force touch is G1, and the gap G after occurrence of the touch force is G2, which is smaller than G1.

Such a decrease of the gap G from G1 to G2, before and after occurrence of a force touch, changes the second capacitance C2 and enables recognition of the force touch.

The spacer 1540 is made of a material that has elasticity, in order to sense a touch force, and can be pressed by an external force and then can be restored.

In addition, the spacer 1540 prevents the upper film 1520 (or the lower structure 1100) and the second electrode E2 from directly contacting each other, and prevents the second electrode E2 from being deformed even when pressed by an external force (force touch).

This may cause a change in size of the gap G between the upper film 1520 and the second electrode E2 (G1→G2).

Furthermore, the spacer 1540 may be made of a conductive material or a nonconductive material.

It is possible to configure the gap structure unit 1000 solely by the spacer 1540.

On the other hand, with regard to the same force touch, the larger the change in size of the gap G at the center point, the higher the sensing sensitivity related to the touch force can be.

In this connection, if the change in gap size at the edge is removed, the change in gap size at the center point can become larger.

To this end, the gap structure unit 1000 may additionally include a lower film 1510, a bonding agent 1530, and the like.

The gap structure unit 1000 of FIG. 15 is implemented in a module type such that, without modifying existing structures such as the display panel 110, the lower structure 1100, and the like, the module-type gap structure unit 1000 can be attached beneath the lower structure 1100. This is advantageous in that the gap structure unit 1000 can be easily included in the touch display device and fabricated as such.

Figure 16:
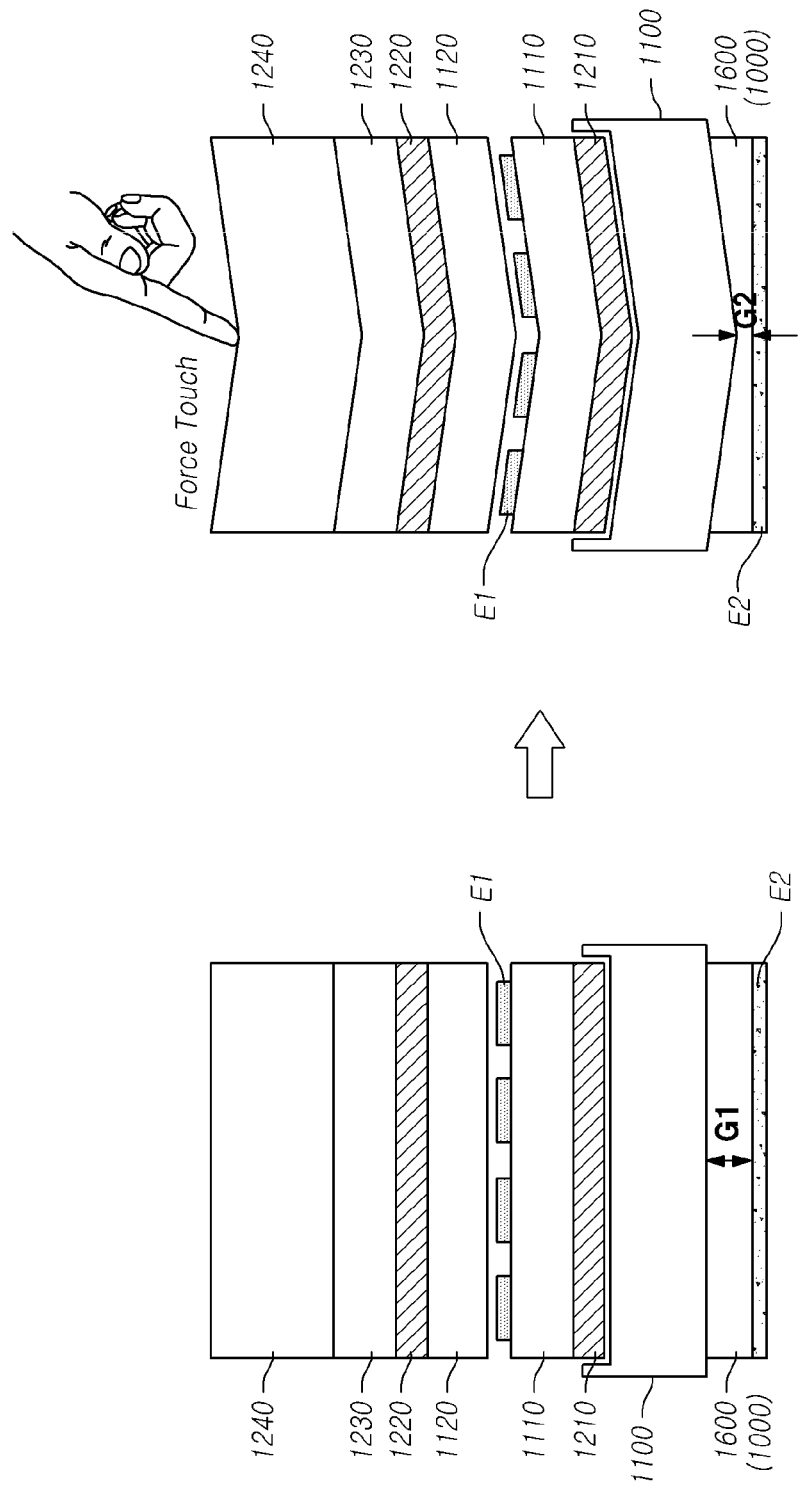

Referring to FIG. 16, the gap structure unit 1000 may include an elastic film 1600 positioned between the upper surface of a second electrode E2 and the rear surface of a lower structure 1100, and the like.

Referring to FIG. 16, when a force touch occurs, the upper cover 1240, the display panel 110, the lower structure 1100, and the like receive a downward force.

Accordingly, the touch force of the touch changes the thickness of the elastic film, and the size of the G between the upper surface of the second electrode E2 and the rear surface of the lower structure 1100 may change as a result.

Particularly, the gap G before occurrence of the force touch is G1, and the gap G after occurrence of the touch force is G2, which is smaller than G1.

Such a decrease of the gap G from G1 to G2, before and after occurrence of a force touch, changes the second capacitance C2 and enables recognition of the force touch.

The gap structure unit 1000 of FIG. 16 has a small thickness and therefore can implement a touch display device 100 capable of force touch sensing without increasing the size thereof.

Referring to FIG. 17, the gap structure unit 1000 may include an inner pattern 1700 embedded in a lower structure 1100 and the like.

The inner pattern 1700 is a pattern provided inside the lower structure 1100 (for example, a backlight unit).

In this case, the inner pattern 1700 may be made of a conductive material or a nonconductive material.

The inner pattern 1700 is made of a material that has elasticity, and thus can be pressed by an external force (force touch) and then can be restored.

In addition, due to the elasticity, the inner pattern 1700 can prevent, even when pressed by an external force, the external force from being transferred to the second electrode E2. That is, the inner pattern 1700 prevent deformation of the second electrode E2.

When a force touch occurs, the upper cover 1240, the display panel 110, the lower structure 1100, and the like receive a downward force.

Accordingly, the inner pattern 1700, which is inside the lower structure 1100, also receives the force, and the force may cause a change in size of the touch force sensing gap (G1→G2), which corresponds to the thickness of the inner pattern 1700.

The gap G before occurrence of the force touch is G1, and the gap G after occurrence of the touch force is G2, which is smaller than G1.

Such a decrease of the gap G from G1 to G2, before and after occurrence of a force touch, changes the second capacitance C2 and enables recognition of the force touch.

The gap structure unit 1000 of FIG. 17 is included inside the lower structure 1100 and therefore can implement a touch display device 100 capable of force touch sensing without changing the size of the touch display device.

Figure 18:
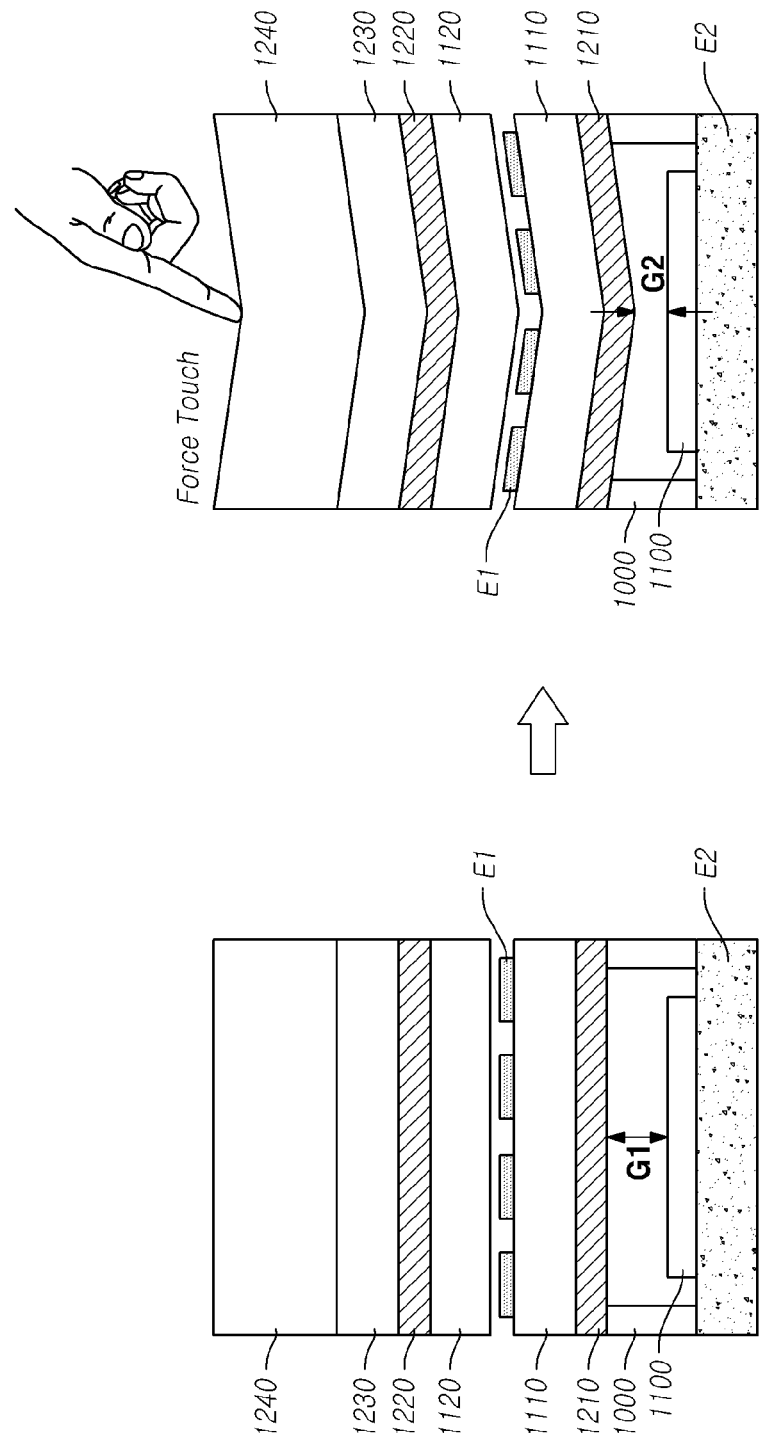

Referring to FIG. 18, the gap structure unit 1000 may be a guide panel positioned along the lower edge of the display panel 110.

In this case, the lower structure 1100 may be positioned inside the gap structure unit 1000, which may be a guide panel. In this regard, the lower structure 1100 may be a backlight unit for emitting light to the display panel 110 from the liquid crystal display device.

A second electrode E2 may be positioned beneath the lower structure 1100.

A touch force sensing gap G may be positioned between the upper portion of the lower structure 1100 and the display panel 110.

Alternatively, an additional touch force sensing gap G may be positioned between the lower portion of the lower structure 1100 and the second electrode E2.

On the other hand, the gap structure unit 1000, which supports the edge portion of the display panel, guarantees that, even if the screen portion is pressed by an external force (force touch), the upper surface of the lower structure 1100 does not make a direct contact with the rear surface of the display panel 110 (i.e., the rear surface of the first polarization plate 1210).

Therefore, the force with which the user presses the screen portion is not directly transferred to the second electrode E2. As a result, the second electrode E2 is not deformed.

When a force touch occurs on the screen portion, the upper cover 1240, the display panel 110, and the like receive a downward force.

This may cause a change in size of the gap G existing between the upper portion of the lower structure 1100 and the display panel 110 (G1→G2).

The gap G before occurrence of the force touch is G1, and the gap G after occurrence of the touch force is G2, which is smaller than G1.

Such a decrease of the gap G from G1 to G2, before and after occurrence of a force touch, changes the second capacitance C2 between the first electrode E1 and the second electrode E2 and enables recognition of the force touch.

On the other hand, the change in size of the touch force sensing gap G, when a touch force occurs, may differ depending on the position.

The change in size of the touch force sensing gap, which exists between the first electrode E1 and the second electrode E2, at the center point of the screen is larger than the change in size of the touch force sensing gap, which exists between the first electrode E1 and the second electrode E2, at the edge point of the screen.

This results from the structural characteristics for touch force sensing, and occurs because the gap structure unit 1000 supports the edge portion of the display panel 110 that lies on the upper portion of the gap structure unit 1000.

Given that the change in size of the touch force sensing gap G differs depending on the position, the degree of change of the second capacitance C2, which is formed between each first electrode E1 and the second electrode E2, varies depending on the position of each first electrode E1, and, as a result, the signal received at each first electrode E1 may also vary.

This makes it possible not only to sense whether a touch force exists or not on the basis of the signal received at each first electrode E1, but also to sense the position in which the touch force has occurred by comparing the size relationship among the signals received at respective first electrodes E1.

FIG. 19 is a diagram illustrating two driving types (driving type A and driving type B) related to a touch mode period TM, between two operation modes (display mode and touch mode) of a touch display device 100 according to the present embodiments.

Referring to FIG. 19, the touch display device 100 may operate in a "display mode" for displaying images or may operate in a "touch mode" for sensing at least one of a touch position and a touch force.

Referring to FIG. 19, the display mode period DM and the touch mode period TM may be time-divided and then proceed.

For example, the touch display device 100 may time-divide a single frame period into a display mode period DM and a touch mode period TM such that a display mode and a touch mode alternate within a single frame period. It is to be noted that, in some frame periods, display mode periods DM may solely exist.

As another example, the touch display device 100 may time-divide a single frame period into two or more display mode periods DM and two or more touch mode periods TM such that a display mode and a touch mode alternate within the single frame period.

As described above, the driving circuit 120 of the touch display device 100 can sense a touch position and a touch force during a touch mode period TM.

To this end, the driving circuit 120 may drive multiple first electrodes E1 or may drive multiple first electrodes E1 and at least one second electrode E2.

During a touch mode period TM, the driving circuit 120 may drive the multiple first electrodes E1 and the at least one second electrode E2 in one of two driving schemes.

Referring to FIG. 19, the two driving schemes include (1) a simultaneously driving scheme, in which driving for sensing a touch position and driving for sensing a touch force proceed simultaneously (Driving type A) and (2) a separate driving scheme, in which driving for sensing a touch position and driving for sensing a force touch proceed separately (Driving Type B).

In the case of the simultaneous driving scheme, during each touch mode period TM, at least one of the multiple first electrodes E1 is driven successively, and the second electrode E2 is driven simultaneously (i.e., driving for sensing a touch position and driving for sensing a touch force proceed simultaneously), and, according to the result of driving during one or at least two touch mode periods TM, the touch position and the touch force may be sensed simultaneously.

In the case of the separate driving scheme, a single touch mode period TM may include at least one of a touch driving period TD and a force driving period FD.

For example, each touch mode period TM may include at least one touch driving period TD and at least one force driving period FD.

In addition, each touch mode period TM may solely include at least one touch driving period TD or may solely include at least one force driving period FD.

Furthermore, the touch driving period TD and the force driving period FD are not supposed to be temporally adjacent directly to each other. That is, a display mode period DM may exist between the touch driving period TD and the force driving period FD.

Hereinafter, the simultaneous driving scheme, in which driving for sensing a touch position and driving for sensing a touch force proceed simultaneously (Driving Type A), will be described with reference to FIG. 20A to FIG. 20C and FIG. 21A to FIG. 21D.

Figure 20A:
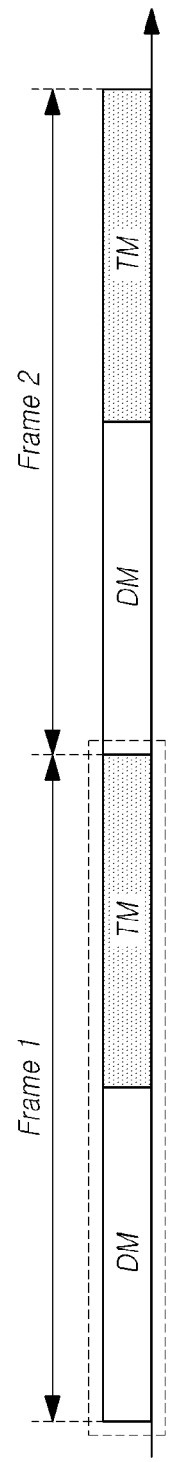
FIG. 20A and FIG. 20B illustrate exemplary schemes of assigning a display mode period and a touch mode period with regard to a simultaneous driving scheme, in which driving for sensing a touch position and driving for sensing a touch force proceed simultaneously (Driving Type A) during a touch mode period of a touch display device according to the present embodiments.
Figure 20B:
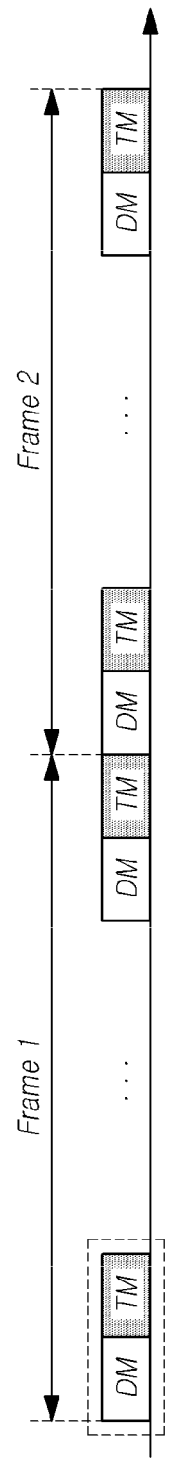

FIG. 20A and FIG. 20B illustrate exemplary schemes of assigning display mode periods DM and touch mode periods TM with regard to the simultaneous driving scheme, in which driving for sensing a touch position and driving for sensing a touch force proceed simultaneously (Driving Type A), of a touch display device 100 according to the present embodiments.

Referring to FIG. 20A, in the case of the simultaneous driving scheme, in which driving for sensing a touch position and driving for sensing a touch force proceed simultaneously during a touch mode period TM (Driving Type A), a single frame period may be time-divided into a display mode period DM and a touch modem period TM.

All frame periods may be time-divided into display mode periods DM and touch mode periods TM; alternatively, only some of all frame periods may be time-divided into display mode periods DM and touch mode periods TM.

Referring to FIG. 20B, in the case of the simultaneous driving scheme, in which driving for sensing a touch position and driving for sensing a touch force proceed simultaneously during a touch mode period TM (Driving Type A), a single frame period may be time-divided into two or more display mode periods DM and two or more touch mode periods TM.

All frame periods may be time-divided into two or more display mode periods DM and two or more touch mode periods TM; alternatively, only some of all frame periods may be time-divided into two or more display mode periods DM and two or more touch mode periods TM.

Referring to FIG. 20A and FIG. 20B, in the case of a soft touch, which is generated by a pointer that has a contact portion made of a conductor, and which is generated by a pressing force equal to or less than a predetermined level (Case 1 of FIG. 3), the driving circuit 120 may simultaneously conduct driving for sensing a touch position and driving for sensing a touch force and then may sense the touch position only, with regard to the touch, on the basis of signals received from respective first electrodes E1.

In addition, in the case of a force touch, which is generated by a pointer that has a contact portion made of a conductor, and which is generated by a pressing force exceeding the predetermined level (Case 2 of FIG. 3), the driving circuit 120 may simultaneously sense the touch position and the touch force, with regard to the touch, on the basis of signals received from respective first electrodes E1.

In addition, in the case of a force touch, which is generated by a pointer that has a contact portion made of a nonconductor, and which is generated by a pressing force exceeding the predetermined level (Case 3 of FIG. 3), the driving circuit 120 may sense the touch force only, with regard to the touch, on the basis of signals received from respective first electrodes E1.

As described above, driving for sensing a touch position and driving for sensing a touch force may proceed simultaneously such that the touch position and the touch force can be sensed simultaneously. This can reduce the time needed to sense the touch position and the touch force, and the display mode period DM, which is assigned for image display, can be lengthened in proportion thereto, thereby helping improve the image quality.

It is to be noted that, among the three touch schemes (Case 1, Case 2, and Case 3), only the touch position can be sensed in the case of a soft touch (Case 1), and only the touch force can be sensed in the case of a force touch by a nonconductor pointer (Case 3).

However, the driving method does not differ with regard to each of the three touch schemes (Case 1, Case 2, and Case 3). Only the kind of the obtained sensing result information (at least one of the touch position and the touch force) differs depending on the three touch schemes (Case 1, Case 2, and Case 3).

On the other hand, during each touch mode period TM, the driving circuit 120 successively applies a first electrode driving signal DS1 to at least one of the multiple first electrodes D1 and simultaneously applies a second electrode driving signal DS2 to the second electrode E2, thereby simultaneously conducting driving for sensing a touch position and driving for sensing a touch force and detecting signals received from respective first electrodes E1.

After conducting all driving during one or at least two touch mode periods TM within one frame period, the driving circuit 120 may sense at least one of the touch position and the touch force, with regard to a single touch, on the basis of signals received from respective first electrodes E1, i.e. on the basis of sensing values related to detection signals from respective first electrodes E1.

According to the above description, it is unnecessary to separately conduct signal detection processing for sensing a touch position and signal detection processing for sensing a touch force, but it is possible to simultaneously sense the touch position and the touch force on the basis of a signal obtained by signal detection processing through one kind of electrode (i.e. each first electrode E1).

FIG. 20C illustrates exemplary four combinations of a first electrode driving signal DS1, which is applied to a first electrode E1, and a second electrode driving signal DS2, which is applied to a second electrode E2, when a driving circuit 120 of a touch display device 100 according to the present embodiments simultaneously conducts driving for sensing a touch position and driving for sensing a touch force.

As in the case of Combination 1 to Combination 4 illustrated in FIG. 20C, the first electrode driving signal DS1 may be a pulse-type signal, and the second electrode driving signal DS2 may be a pulse-type signal or a single having a DC voltage.

AS described above, the fact that various combinations of the first electrode driving signal DS1 and the second electrode driving signal DS2 enable driving that conforms to the power supply system environment of the touch display device 100 or system environments thereof, such as signal generation, signal conversion scheme, or the like.

AS described above, the fact that driving can be conducted using a first electrode driving signal DS1 and a second electrode driving signal DS2, which has an equiphase or reverse-phase relationship, during a touch mode period TM enables driving that conforms to the power supply system environment of the touch display device 100 or system environments thereof, such as signal generation, signal conversion scheme, or the like.

When the first electrode driving signal DS1 and the second electrode driving signal DS2 are pulse-type signals having an equiphase relationship, as in the case of Combination 1 of FIG. 20C, the second electrode driving signal DS2 have the same phase and the same frequency as those of the first electrode driving signal DS1. However, the amplitude V2 of the second electrode driving signal DS2 is larger than the amplitude V1 of the first electrode driving signal DS1.

As described above, when the first electrode driving signal DS1 and the second electrode driving signal DS2 are pulse-type signals having an equiphase relationship, the amplitude V2 of the second electrode driving signal DS2 can be made larger than the amplitude V1 of the first electrode driving signal DS1 such that, even if touch position information and touch force information are mixed and exist in signals received through the first electrodes E1, the touch position and the touch force can be accurately distinguished and sensed.

On the other hand, when the first electrode driving signal DS1 and the second electrode driving signal DS2 are pulse-type signals having a reverse-phase relationship, the second electrode driving signal DS2 has the same phase and the same frequency as those of the first electrode driving signal DS1. The amplitude V2 of the second electrode driving signal DS2 may be larger than, smaller than, or identical to the amplitude V1 of the first electrode driving signal DS1.

On the other hand, when the second electrode driving signal DS2 is a signal having a DC voltage, as in the case of Combinations 3 and 4 illustrated in FIG. 20C, the DC voltage may be a predetermined reference voltage Vref2 or a ground voltage GND.

FIG. 21A to FIG. 21D are diagrams illustrating exemplary signal waveforms applied to a first electrode E1 and a second electrode E2 during a display mode period DM and a touch mode period TM, when a touch display device 100 according to the present embodiments simultaneously conducts driving for sensing a touch position and driving for sensing a touch force during a touch mode period TM.

Referring to FIG. 21A to FIG. 21D, the display mode period DM and the touch mode period TM may be defined by a synchronization signal SYNC.

For example, when the synchronization signal SYNC is at a high level (or low level), the operation mode period of the touch display device 100 may correspond to the display mode period DM; and, when the synchronization signal SYNC is at a low level (or high level), the operation mode period of the touch display device 100 may correspond to the touch mode period TM.

The synchronization signal SYNC may be a control signal provided from a timing controller (not illustrated) to the driving circuit 120.

Figure 21A:
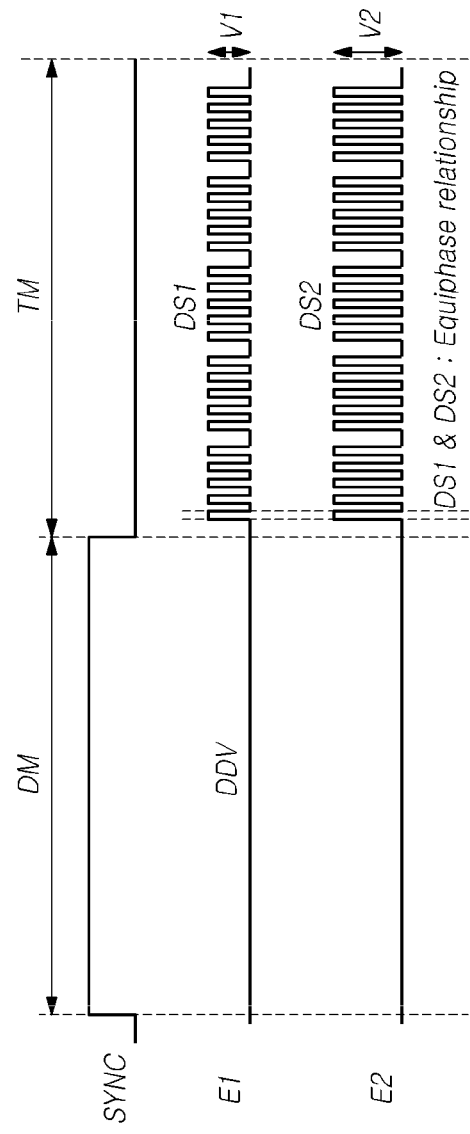
FIG. 21A to FIG. 21D are diagrams illustrating exemplary signal waveforms applied to a first electrode and to a second electrode during a display mode period and during a touch mode period, when a touch display device according to the present embodiments simultaneously conducts driving for sensing a touch position and driving for sensing a touch force in a touch mode period.
Figure 21B:
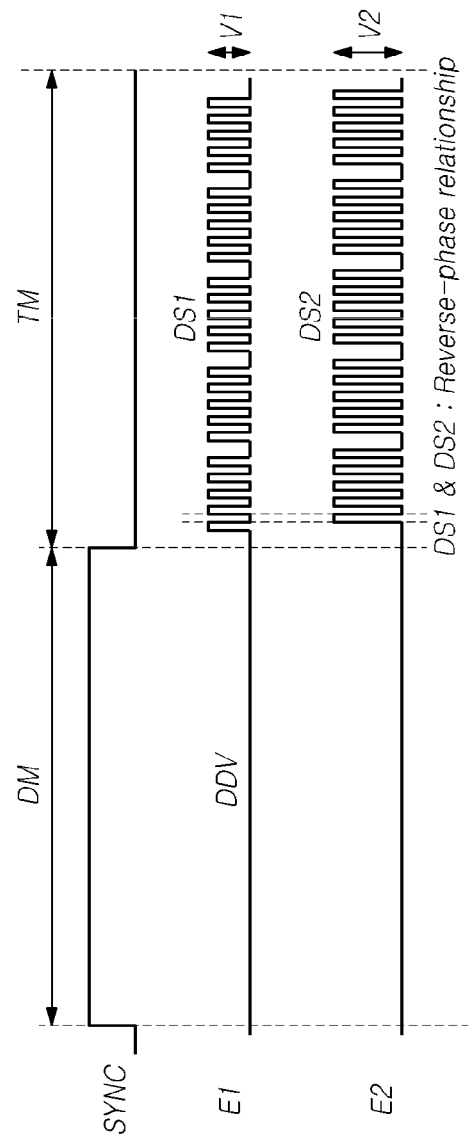
Figure 21C:
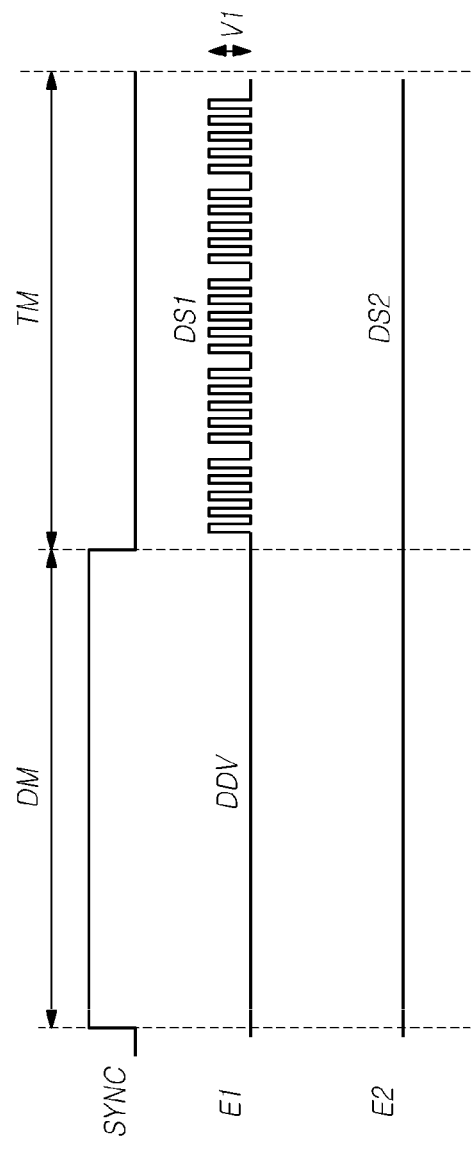
Figure 21D:
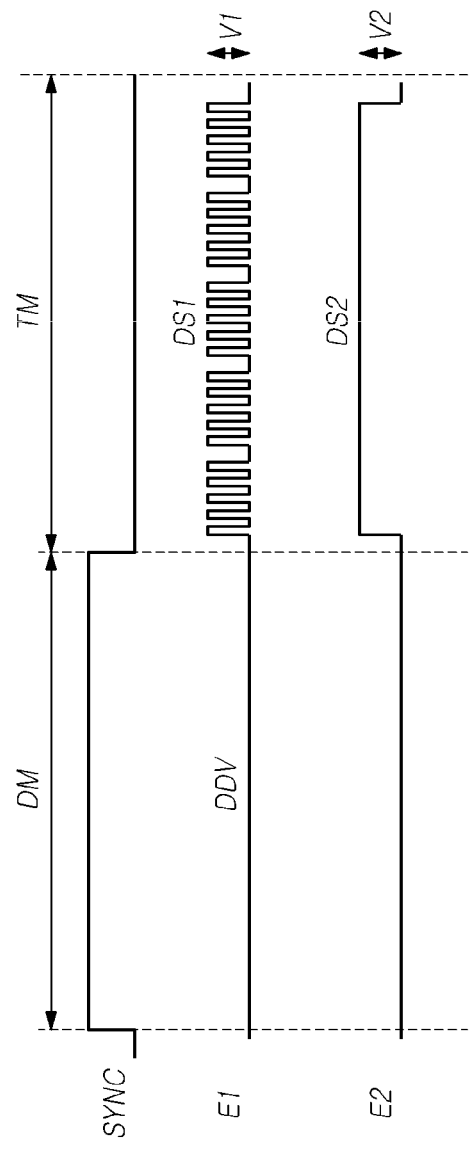

FIG. 21A corresponds to a case in which Combination 1 of FIG. 20C is used for driving during the touch mode period TM; FIG. 21B corresponds to a case in which Combination 2 of FIG. 20C is used for driving during the touch mode period TM; FIG. 21C corresponds to a case in which Combination 3 of FIG. 20C is used for driving during the touch mode period TM; and FIG. 21D corresponds to a case in which Combination 4 of FIG. 20C is used for driving during the touch mode period TM.

Referring to FIG. 21A, FIG. 21B, FIG. 21C, and FIG. 21D, a display driving voltage DDV may be applied to multiple first electrodes E1 during the display mode period DM.

For example, a common voltage Vcom, which corresponds to the display driving voltage DDV, may be applied to all of the multiple first electrodes E1.

Although the low level voltage of the first electrode driving signal DS1 is illustrated as being equal to the display driving voltage DDV in FIG. 21A, FIG. 21B, FIG. 21C, and FIG. 21D, the low level voltage of the first electrode driving signal DS1 may be lower or higher than the display driving voltage DDV in some cases.

In addition, although application of the ground voltage GND to the second electrode E2 during the display mode terminal DM is illustrated in FIG. 21A, FIG. 21B, FIG. 21C, and FIG. 21D, the same is only an example; not only the ground voltage GND, but also the display driving voltage DDV may be applied; a different specific DC voltage may be applied; an AC voltage (pulse signal) may be applied; or no voltage may be applied (floating state).

Hereinafter, the separate driving scheme, in which driving for sensing a touch position and driving for sensing a touch force proceed separately (Driving Type B), will be described with reference to FIG. 22A to FIG. 22E and FIG. 23A to FIG. 23E.

Figure 22A:
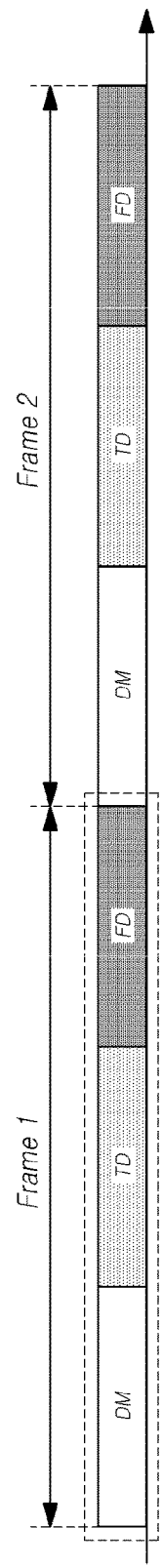
FIG. 22A to FIG. 22C illustrate exemplary schemes of assigning a display mode period and a touch mode period with regard to a separate driving scheme, in which driving for sensing a touch position and driving for sensing a touch force proceed separately (Driving Type B), during a touch mode period of a touch display device according to the present embodiments.
Figure 22B:
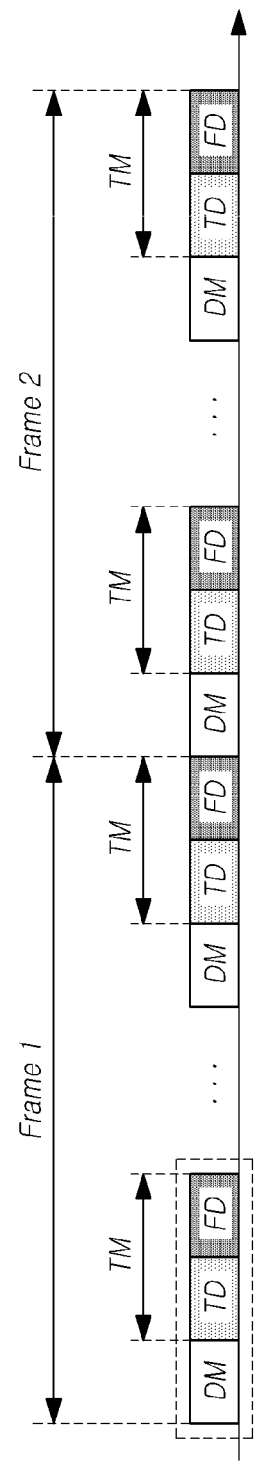
Figure 22C:
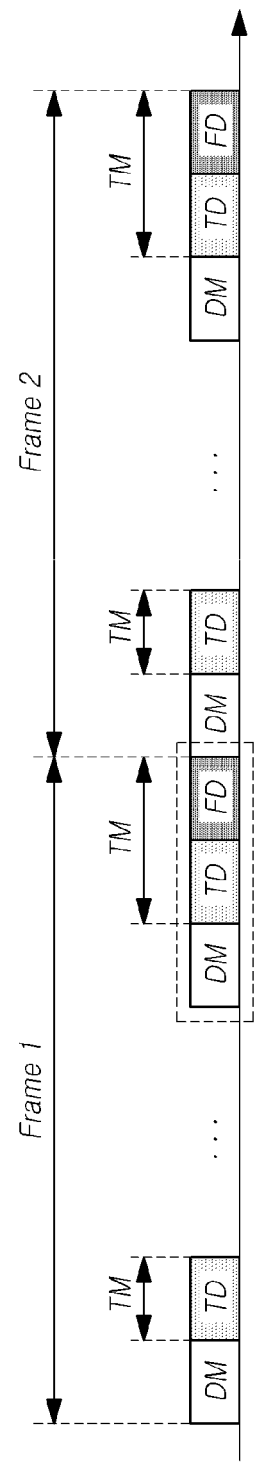

FIG. 22A and FIG. 22C illustrate exemplary schemes of assigning display mode periods DM and touch mode periods TM with regard to the separate driving scheme, in which driving for sensing a touch position and driving for sensing a touch force proceed separately (Driving Type B), during the touch mode period TM of a touch display device 100 according to the present embodiments.

Referring to FIG. 22A and FIG. 22B, in the case of the separate driving scheme, in which driving for sensing a touch position and driving for sensing a touch force proceed separately during a touch mode period TM (Driving Type B), each touch mode period TM may include a touch driving period TD for sensing a touch position and a force driving period FD for sensing a touch force.

For example, as illustrated in FIG. 22A and FIG. 22B, each of all touch mode periods TM may include a touch driving period TD for sensing a touch position and a force driving period FD for sensing a touch force.

As another example, as illustrated in FIG. 22C, one or more touch mode periods TM may solely include a touch driving period TD for sensing a touch position, and one or more different touch mode periods TM may include both a touch driving period TD for sensing a touch position and a force driving period FD for sensing a touch force.

As another example, one or more touch mode periods TM may solely include a touch driving period TD, and one or more different touch mode periods DM may solely include a force driving period FD.

Besides above examples, any type of period assignment is possible as long as the touch driving period TD and the force driving period FD are separated from each other.

On the other hand, referring to FIG. 22A to FIG. 22C, a single frame period always includes at least one display mode period DM.

In addition, as illustrated in FIG. 22A to FIG. 22C, a single frame period may or may not always include at least one touch mode period TM.

That is, one or at least two touch mode periods TM may exist during each of at least one frame period.

One or more touch driving periods TD may exist in each frame period.

Alternatively, one or more touch driving periods TD may exist in each of two or more frame periods. That is, no touch driving period TD may exist in some frame periods.

In addition, one or more force driving periods FD may exist in each frame period.

Alternatively, one or more force driving periods FD may exist in each of two or more frame periods. That is, no force driving period FD may exist in some frame periods.

Referring to FIG. 22A to FIG. 22C, the driving circuit 120 successively applies a first electrode driving signal DS1, which correspond to a touch driving signal TDS, to at least one of multiple first electrodes E1, during a touch driving period TD, and senses a touch position, with regard to the touch, on the basis of signals received from respective first electrodes E1.

The driving circuit 120 may apply a first electrode driving signal DS1, which corresponds to a first force driving signal FDS1, to all or some of the multiple first electrodes E1, during a force driving period FD, may simultaneously apply a second electrode driving signal DS2, which corresponds to a second force driving signal FDS2, to the second electrode E2, and may sense a touch force, with regard to the touch, on the basis of signals received from respective first electrodes E1.

As described above, driving for sensing a touch position and driving for sensing a touch force proceed separately such that the touch position and the touch force can be sensed accurately and without confusion.

FIG. 22D and FIG. 22E illustrate exemplary eight combinations of a first force driving signal FDS1, which is applied to a first electrode E1, and a second force driving signal FDS2, which is applied to a second electrode E2, when a driving circuit 120 of a touch display device 100 according to the present embodiments separately conducts driving for sensing a touch position and driving for sensing a touch force.

As in the case of Combinations 1 and 2 illustrated in FIG. 22D, the first force driving signal FDS1 and the second force driving signal FDS2 both may be pulse-type signals.

Alternatively, as in the case of Combinations 3 and 4 illustrated in FIG. 22D, the first force driving signal FDS1 may be a pulse-type signal, and the second force driving signal FDS2 may be a signal having a second DC voltage.

Alternatively, as in the case of Combinations 5 and 6 illustrated in FIG. 22D, the first force driving signal FDS1 may be a signal having a first DC voltage, and the second force driving signal FDS2 may be a pulse-type signal.

Alternatively, as in the case of Combinations 7 and 8 illustrated in FIG. 22E, the first force driving signal FDS1 may be a signal having a first DC voltage, and the second force driving signal FDS2 may be a signal having a second DC voltage.

As described above, it is possible to selectively use one or at least two of various combinations of the first force driving signal FDS1 and the second force driving signal FDS2 according to the system environment, thereby providing efficient driving for sensing a touch force.

When the first force driving signal FDS1 and the second force driving signal FDS2 are pulse-type signals as in the case of Combinations 1 and 2 illustrated in FIG. 22D, the first force driving signal FDS1 and the second force driving signal FDS2 may have an equiphase relationship or a reverse-phase relationship.

As described above, the phase relationship (equiphase relationship or reverse-phase relationship) between the first force driving signal FDS1 and the second force driving signal FDS2 can be properly selected and used in view of the signal generating configuration and the force driving and sensing configuration, thereby improving the efficiency of the signal generating configuration and of the force driving and sensing configuration.

When the first force driving signal FDS1 and the second force driving signal FDS2 are pulse-type signals having an equiphase relationship as illustrated in Combination 1 of FIG. 22D, the second force driving signal FDS2 has the same phase and the same frequency as those of the first force driving signal FDS1. However, the amplitude V2 of the second force driving signal FDS2 is larger than the amplitude V1 of the first force driving signal FDS1.

When the first force driving signal FDS1 and the second force driving signal FDS2 are pulse-type signals having an equiphase relationship as described above, the amplitude V2 of the second force driving signal FS2 can be made larger than the amplitude V1 of the first force driving signal FDS1 such that, when a force is sensed on the basis of a received signal received through a first electrode E1, it can be accurately distinguished whether the corresponding touch is a force touch or a soft touch, thereby accurately sensing whether a touch force exists or not and the magnitude thereof.

When the first force driving signal FDS1 and the second force driving signal FDS2 have a reverse-phase relationship, the second force driving signal FDS2 has the same phase and the same frequency as those of the first force driving signal FDS1. The amplitude V2 of the second force driving signal FDS2 may be identical to or different from the amplitude V1 of the first force driving signal FDS1.

The first DC voltage of the first force driving signal FDS1 may be a first reference voltage Vref1 or a ground voltage GND.

The second DC voltage of the second force driving signal FDS2 may be a second reference voltage Vref2 or a ground voltage GND.

The first reference voltage Vref1 and the second Vref2 may be identical or different.

When the first force driving signal FDS1 is a signal having a first DC voltage, and when the second force driving signal FDS2 is a signal having a second DC voltage, the first DC voltage and the second DC voltage may differ from each other.

FIG. 23A to FIG. 23E are diagrams illustrating exemplary signal waveforms applied to a first electrode E1 and a second electrode E2 during a display mode period DM, a touch mode period TM, and a force driving period FD, when a touch display device 100 according to the present embodiments separately conducts driving for sensing a touch position and driving for sensing a touch force during a touch mode period TM.

Figure 23A:
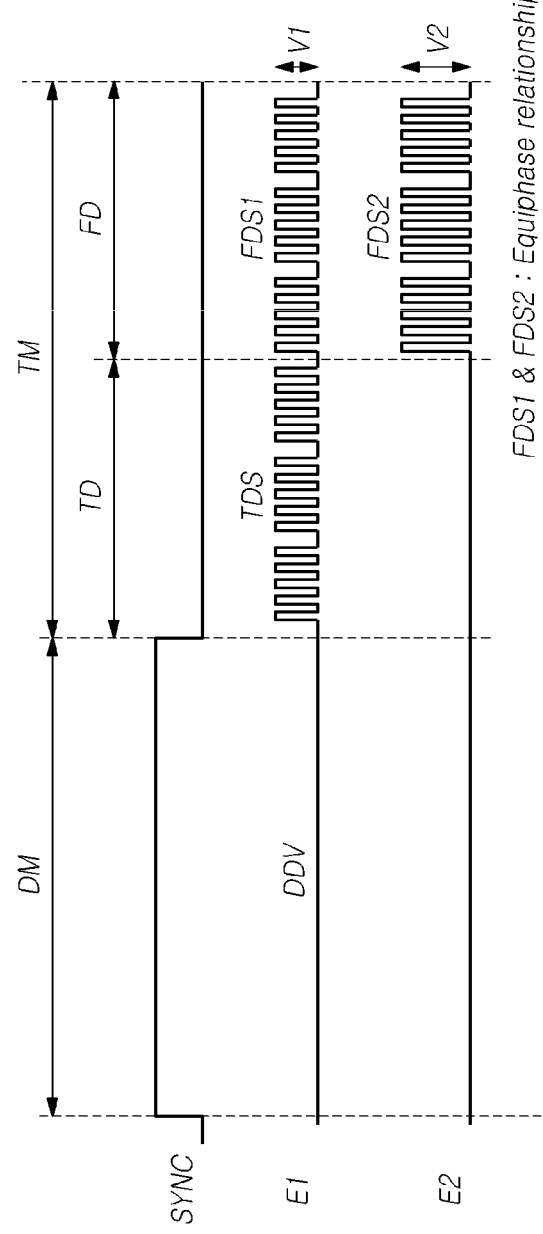
FIG. 23A to FIG. 23E are diagrams illustrating exemplary signal waveforms applied to a first electrode and to a second electrode during a display mode period, during a touch mode period, and during a force driving period, when a touch display device according to the present embodiments separately conducts driving for sensing a touch position and driving for sensing a touch force in a touch mode period.
Figure 23B:
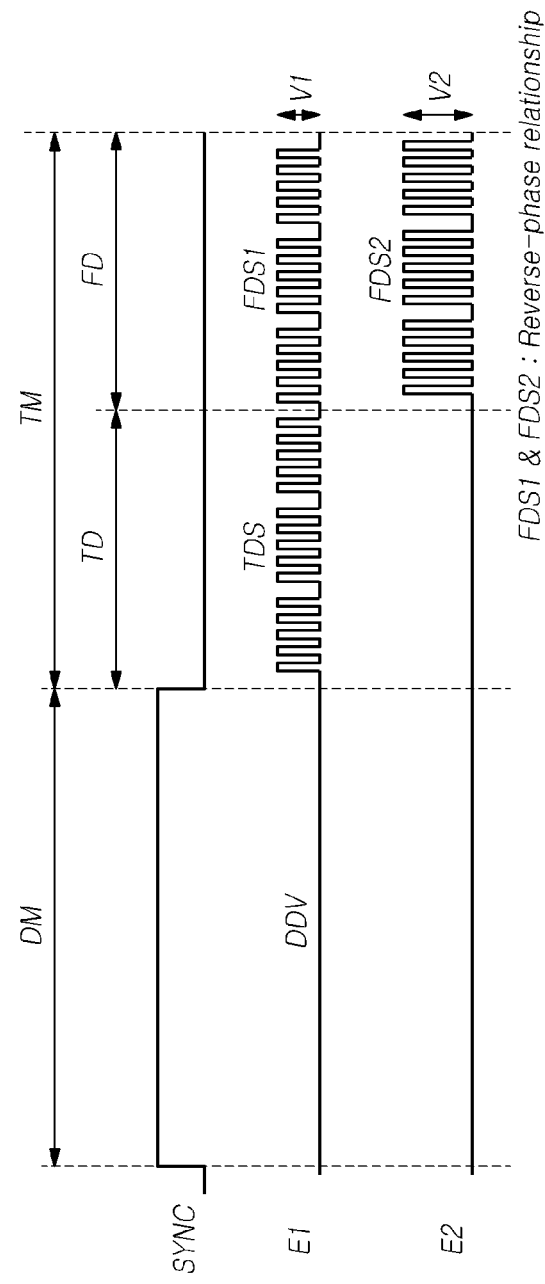
Figure 23C:
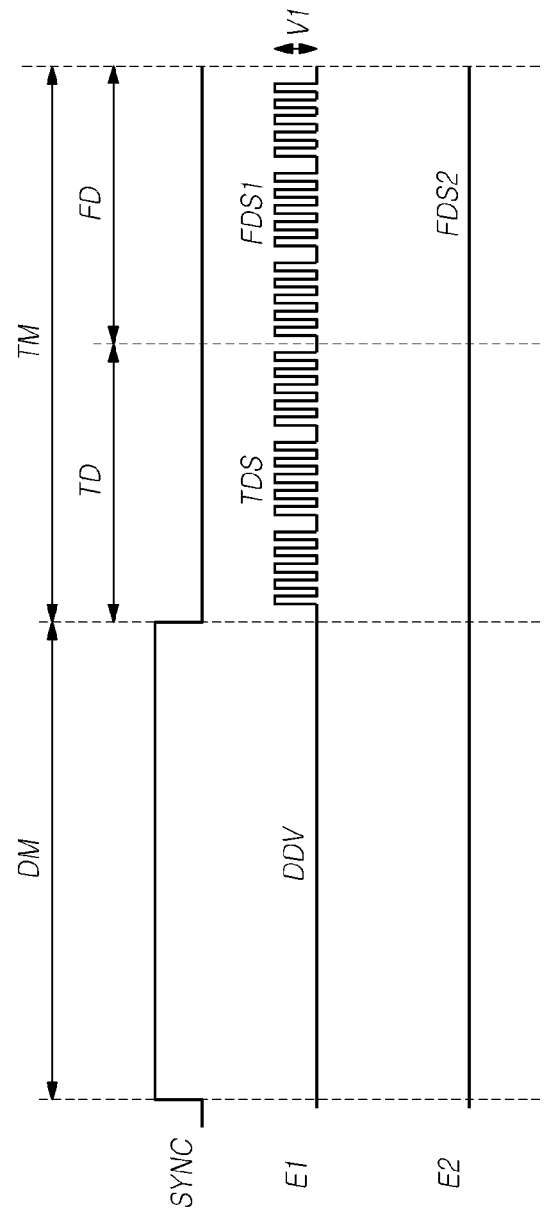
Figure 23D:
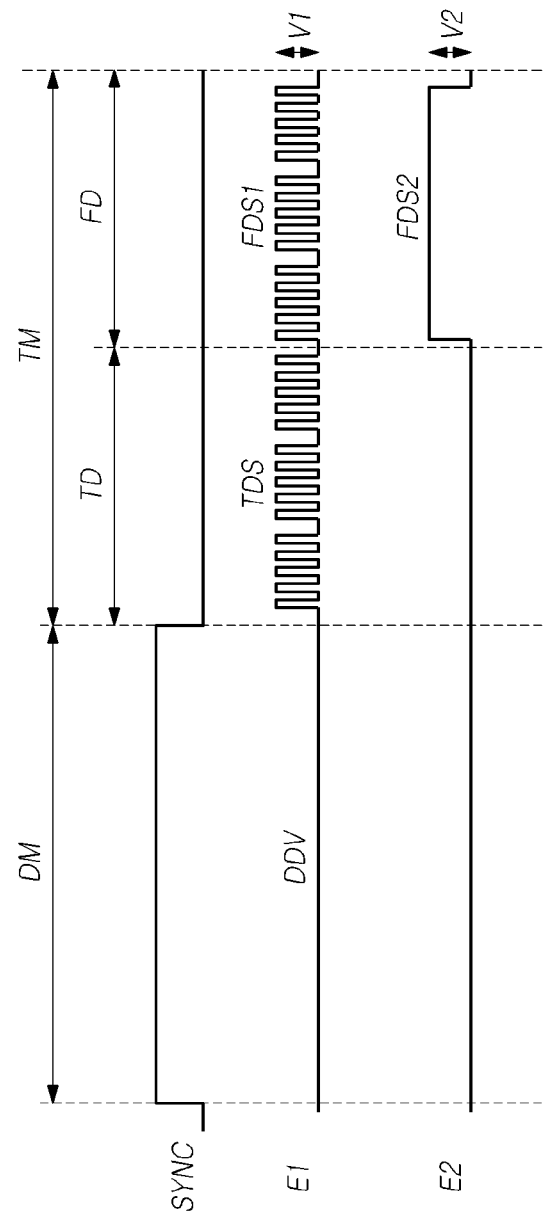

FIG. 23A corresponds to a case in which Combination 1 of FIG. 22C is used for driving during the touch mode period TM; FIG. 23B corresponds to a case in which Combination 2 of FIG. 22C is used for driving during the touch mode period TM; FIG. 23C corresponds to a case in which Combination 3 of FIG. 22C is used for driving during the touch mode period TM; FIG. 23D corresponds to a case in which Combination 4 of FIG. 22C is used for driving during the touch mode period TM; and FIG. 23E corresponds to a case in which Combination 6 of FIG. 22C is used for driving during the touch mode period TM.

Referring to FIG. 23A to FIG. 23E, a display driving voltage DDV may be applied to multiple first electrodes E1 during the display mode period DM.

For example, a common voltage Vcom, which corresponds to the display driving voltage DDV, may be applied to all of the multiple first electrodes E1.

Although application of the ground voltage GND to the second electrode E2 during the display mode period DM is illustrated, this is only an example; not only the ground voltage GND, but also the display driving voltage DDV may be applied; a different specific DC voltage may be applied; an AC voltage (pulse signal) may be applied; or no voltage may be applied (floating state).

Referring to FIG. 23A to FIG. 23E, during a touch driving period TD included in the touch mode period TM, a touch driving signal TDS, which corresponds to a first electrode driving signal DS1, may be applied to the multiple first electrodes E1. In this regard, the touch driving signal TDS may be a signal such as the pulse-type first electrode driving signal DS1 illustrated in FIG. 5.

Although application of the ground voltage GND to the second electrode E2 during the touch driving period TD included in the touch mode period TM is illustrated, this is only an example; not only the ground voltage GND, but also the display driving voltage DDV may be applied; a different specific DC voltage may be applied; an AC voltage (pulse signal) may be applied; or no voltage may be applied (floating state).

On the other hand, when a touch driving signal TDS is being applied to a first electrode E1 during a touch driving period TD, a parasitic capacitance may be formed between the first electrode E1 and the second electrode E2.

Such a parasitic capacitance may act as sensing noise when a touch position is sensed on the basis of a signal received through the first electrode E1.

Therefore, during a touch driving period TD, a second electrode driving signal DS2, which has at least one of the same frequency, the same phase, and the same amplitude as that of the touch driving signal TDS that is applied to the first electrode E1, may be applied to the second electrode E2.

This can prevent formation of a parasitic capacitance between the first electrode E1 and the second electrode E2, thereby improving the sensing accuracy.

In this regard, the second electrode driving signal DS2, which has at least one of the same frequency, the same phase, and the same amplitude as that of the touch driving signal TDS that is applied to the first electrode E1 during the touch driving period TD, is referred to as a load-free driving signal.

Although the low level voltages of the touch driving signal TDS and the first force driving signal FDS1, which correspond to the first electrode driving signal DS1, are illustrated as being equal to the display driving voltage DDV in FIG. 23A to FIG. 23E, the low level voltages may be lower or higher than the display driving voltages DDV in some cases.

In addition, although application of the ground voltage GND to the second electrode E2 during the display mode period DM and the touch driving period TD is illustrated in FIG. 23A to FIG. 23E, this is only an example; not only the ground voltage GND, but also the display driving voltage DDV may be applied; a different specific DC voltage may be applied; an AC voltage (pulse signal) may be applied; or no voltage may be applied (floating state).

Figure 23E:
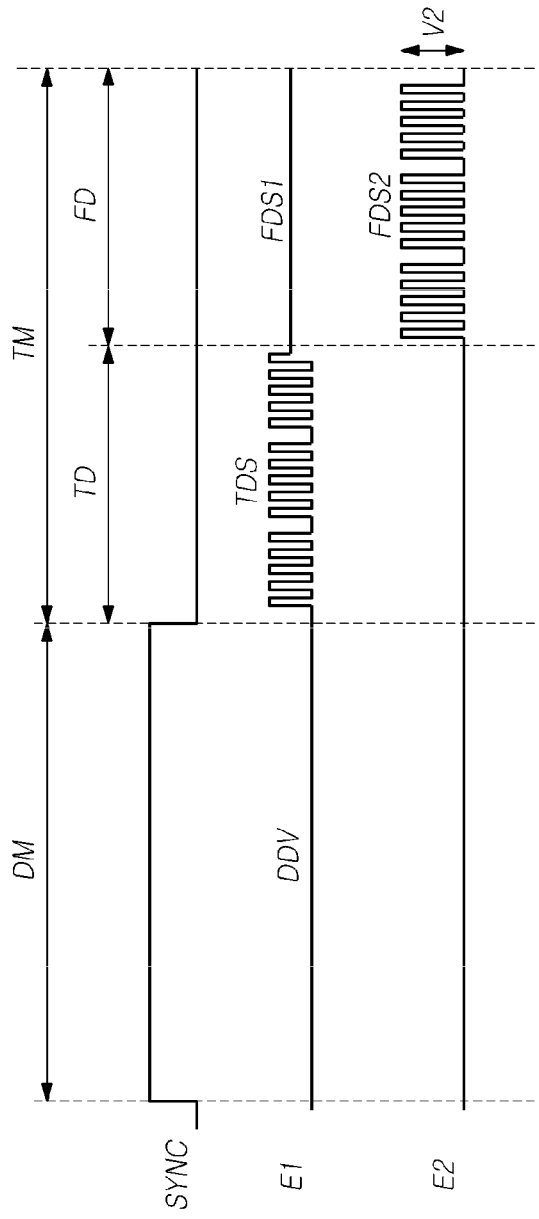

During a force driving period TD included in the touch mode period TM, a first force driving signal FDS1, which corresponds to a first electrode driving signal DS1 of a pulse type, may be applied to the first electrode E1, as illustrated in FIG. 23A to FIG. 23D, or a first force driving signal FDS1, which corresponds to a first electrode driving signal DS1 of a first DC voltage (for example, Vref1, GNC, Vcom, or the like), may be applied to the first electrode E1 as illustrated in FIG. 23E.

Figure 24:
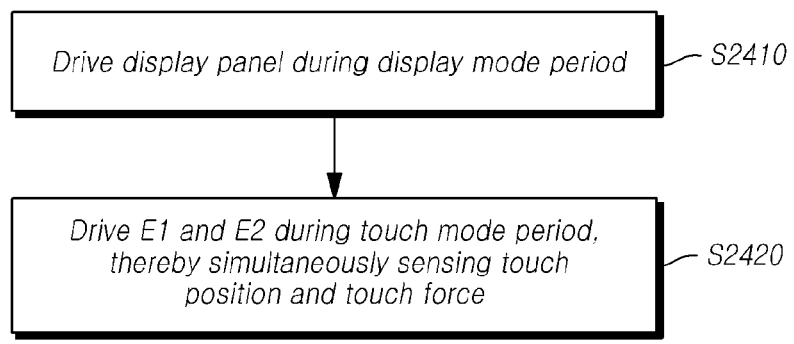
FIG. 24 is a flowchart of a simultaneous driving method for simultaneously conducting driving for sensing a touch position and driving for sensing a touch force during a touch mode period by a touch display device according to the present embodiments.

FIG. 24 is a flowchart of a simultaneous driving method for simultaneously conducting driving for sensing a touch position and driving for sensing a touch force during a touch mode period TM by a touch display device 100 according to the present embodiments.

Referring to FIG. 24, the simultaneous driving method by a touch display device 100 according to the present embodiments, when the touch display device 100 simultaneously conducts driving for sensing a touch position and driving for sensing a touch force during a touch mode period TM, comprises the steps of: driving multiple data lines and multiple gate lines, which are arranged on a display panel 110, during a display mode period DM such that the gradation of each subpixel is adjusted, thereby driving the display panel 110 (S2410); successively applying a first electrode driving signal DS1 to at least one of multiple first electrodes E1, which are embedded in the display panel 110, and simultaneously applying a second electrode driving signal DS2 to a second electrode E2, which is positioned outside the display panel 110, such that the touch position and the touch force are simultaneously sensed with regard to a single touch (S2420); and the like.

The above-mentioned simultaneous driving method, when employed, makes it possible to simultaneously sense the touch position and the touch force, with regard to a touch generated by a pointer such as a finger, a pin, or the like, through the same driving scheme during the touch mode period TM.

Figure 25A:
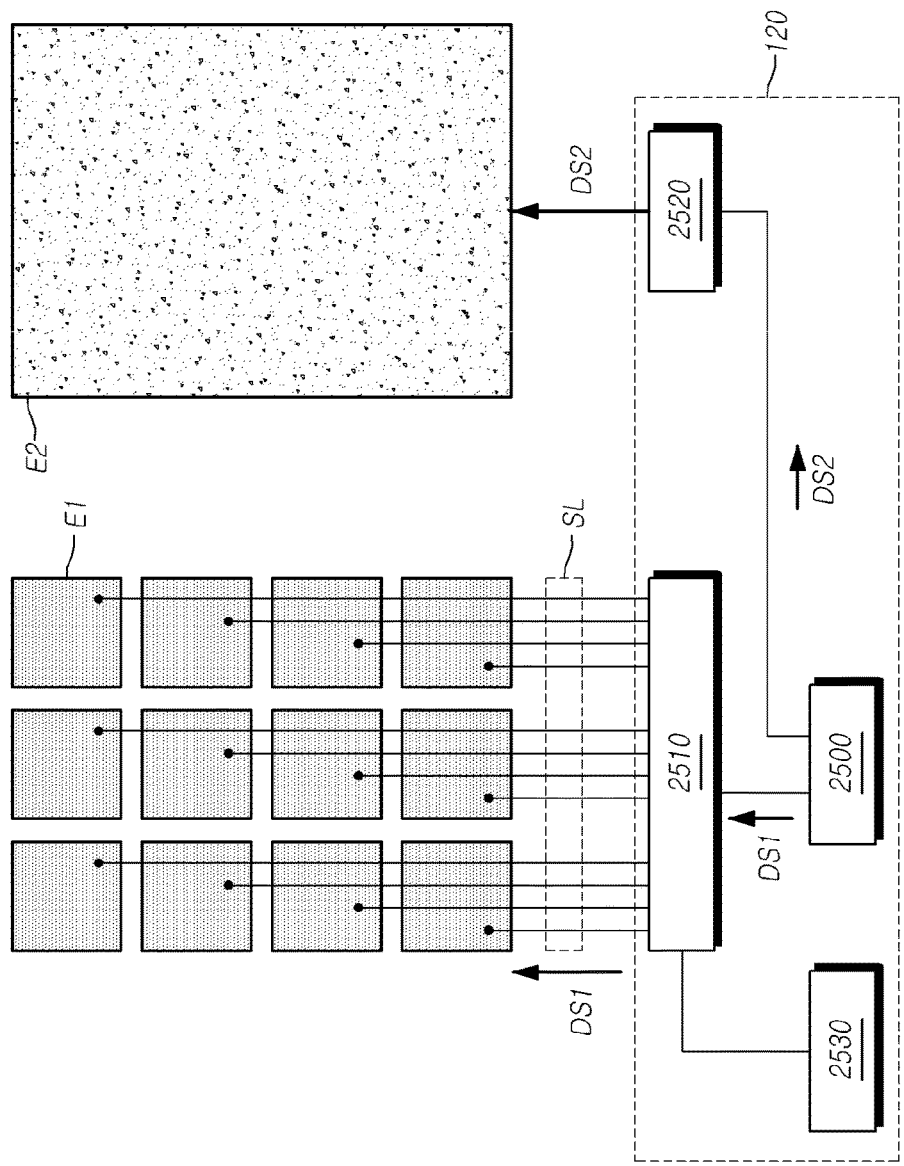
FIG. 25A and FIG. 25B are diagrams illustrating a driving circuit for simultaneous driving by a touch display device according to the present embodiments.
Figure 25B:
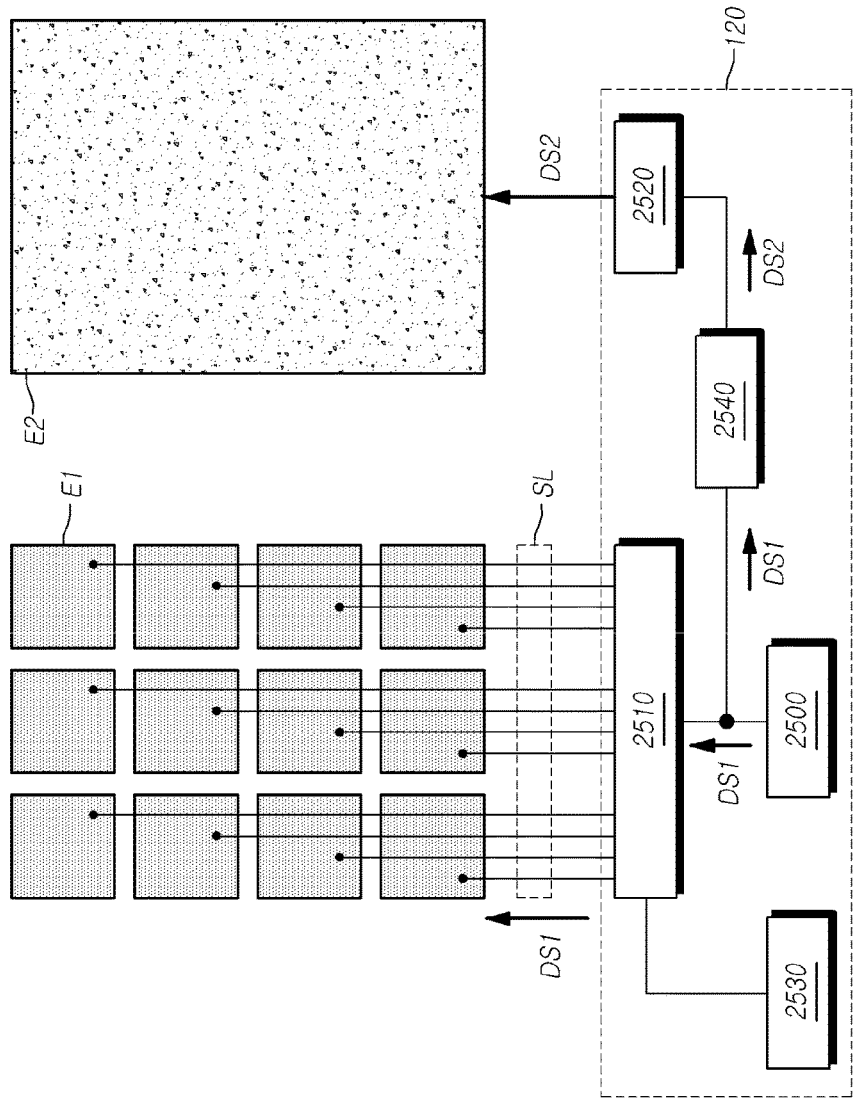

FIG. 25A and FIG. 25B are diagrams illustrating a driving circuit 120 for simultaneous driving by a touch display device 100 according to the present embodiments.

Referring to FIG. 25A and FIG. 25B, assuming that the touch display device 100 according to the present embodiments simultaneously conducts driving for sensing a touch position and driving for sensing a touch force during a touch mode period TM, the driving circuit 120 of the touch display device 100 may include a signal generating circuit 2500, a first electrode driving circuit 2510, a second electrode driving circuit 2520, and the like.

Referring to FIG. 25A and FIG. 25B, the signal generating circuit 2500 may generate and output a first electrode driving signal DS1.

The signal generating circuit 2500 may further generate a second electrode driving signal DS2. FIG. 25A is a diagram illustrating the driving circuit 120 when the signal generating circuit 2500 generates the second electrode driving signal DS2, and FIG. 25B is a diagram illustrating the driving circuit 120 when the signal generating circuit 2500 does not generate the second electrode driving signal DS2.

Referring to FIG. 25A and FIG. 25B, the first electrode driving circuit 2510 may apply a display driving voltage to multiple first electrodes E1, which are embedded in the display panel 110, during a display mode period DM and may successively apply a first electrode driving signal DS1 to at least one of the multiple first electrodes E1, which are embedded in the display panel 110, during a touch mode period TM.

The first electrode driving circuit 2510 may include the integrator 730, the analog-digital converter ADC, and the like, which are illustrated in FIG. 7.

Assuming that the multiple first electrodes E1 are one of display driving electrodes, to which a display driving voltage DDV is applied during a display mode period DM, the first electrode driving circuit 2510 may apply the display driving voltage to all of the multiple first electrodes E1 during the display mode period DM.

Therefore, the multiple first electrodes E1 play the role of display driving electrodes in a display mode period DM and play the role of a touch sensor and a force sensor in a touch mode period TM.

Referring to FIG. 25A and FIG. 25B, the second electrode driving signal 2520 is a circuit for applying a second electrode driving signal DS2 to a second electrode E2, which is positioned outside the display panel 110, in a touch mode period TM. For example, the second electrode driving circuit 2520 may be implemented as at least one printed circuit, on which signal wiring is arranged so as to transfer a second electrode driving signal DS2 to the second electrode E2.

Using the above-mentioned driving circuit 120 makes it possible to provide a touch sensing function of sensing a touch position and a force sensing function of sensing a touch force. Particularly, driving for sensing a touch position and driving for sensing a touch force can proceed simultaneously, thereby providing two kinds of touch-related driving and sensing efficiently.

Referring to FIG. 25A, the signal generating circuit 2500 may further generate and output a second electrode driving signal DS2.

Accordingly, the second electrode driving circuit 2520 may transfer the second electrode driving signal DS2, which has been generated and output by the signal generating circuit 2500, to the second electrode E2.

Given that the signal generating circuit 2500 additionally generates and outputs a second electrode driving signal DS2, besides the first electrode driving signal DS1, as illustrated in FIG. 25A, driving in the touch mode period may be facilitated by using the second electrode driving signal DS2, which has a type different from that of the first electrode driving signal DS1.

Referring to FIG. 25B, the signal generating circuit 2500 does not generate the second electrode driving signal DS2; therefore, the driving circuit 120 may further include a signal converter 2540 configured to convert the first electrode driving signal DS1, which has been generated by the signal generating circuit 2500, thereby generating a second electrode driving signal DS2.

The signal converter 2540 may convert at least one of the amplitude, phase, and the like of the first electrode driving signal DS1, for example, thereby generating a second electrode driving signal DS2.

In this case, the signal generating circuit 2500 has only to generate the first electrode driving signal DS1; as a result, the signal generating burden can be alleviated, and efficient touch driving can be provided.

The signal converter 2540 may include, for example, a level shifter configured to adjust the signal voltage level, may include a phase controller configured to control the signal phase, and may include a DA converter configured to convert a DC signal to an AC signal (pulse signal) or an AD converter configured to convert an AC signal (pulse signal) to a DC signal. The signal converter 2540 may be regarded as a second electrode driving circuit 2520, and may also be regarded as being included in the second electrode driving circuit 2520.

Referring to FIG. 25A and FIG. 25B, the driving circuit 120 may further include a sensing processor 2530 configured to sense at least one of the touch position and the touch force, with regard to a single touch, on the basis of a signal received from at least one first electrode E1 through the first electrode driving circuit 120 in a touch mode period TM.

The sensing processor 2530 may have a configuration corresponding to that of the processor 740 illustrated in FIG. 7.

As described above, the sensing processor 2530 receives the signal, which has been received from the first electrode E1, through the first electrode driving circuit 2510 and senses not only the touch position, but also the touch force, thereby being able to efficiently performing two kinds of sensing in the same processing scheme.

On the other hand, each of the signal generating circuit 2500, the first electrode driving circuit 2510, and the sensing processor 2530 may be implemented as a separate integrated circuit or a processor.

For example, the signal generating circuit 2500 may be implemented as a power IC, and the sensing processor 2530 may be a MCU (Micro Controller Unit). The first electrode driving circuit 2510 may be implemented as a first electrode driving IC.

On the other hand, at least two of the signal generating circuit 2500, the first electrode driving circuit 2510, and the sensing processor 2530 may be implemented as a single IC.

For example, the signal generating circuit 2500 and the first electrode driving circuit 2510 may be included in a single IC and implemented as such.

As another example, the signal generating circuit 2500, the first electrode driving circuit 2510, and the sensing processor 2530 may be integrally included in a single IC and implemented as such.

On the other hand, the first electrode driving circuit 2510 may further include a data driving circuit configured to apply a data voltage to multiple data lines, which are arranged on the display panel 110, during a display mode period.

As described above, the fact that the driving circuit 120 can be implemented in various types makes it possible to design a driving circuit 120, which is optimized to the size of the touch display device 100 (for example, medium/large TV size, mobile terminal size, or the like), the system environment, or the power supply system environment.

Figure 26:
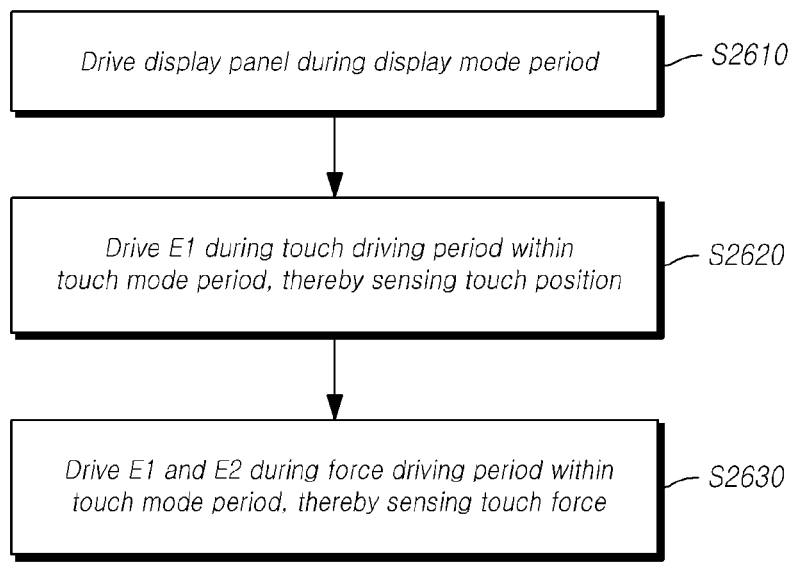
FIG. 26 is a flowchart of a separate driving method by which a touch display device according to the present embodiments separately conducts driving for sensing a touch position and driving for sensing a touch force during a touch mode period.

FIG. 26 is a flowchart of a separate driving method by which a touch display device 100 according to the present embodiments separately conducts driving for sensing a touch position and driving for sensing a touch force during a touch mode period TM.

Referring to FIG. 26, the separate driving method by a touch display device 100 according to the present embodiments, when the touch display device 100 separately conducts driving for sensing a touch position and driving for sensing a touch force during a touch mode period TM, includes the steps of: driving a display panel 110 in a display mode period DM (S2610); successively applying a touch driving signal TDS to at least one of multiple first electrodes E1, which are embedded in the display panel 110, in a touch driving period TD, thereby sensing the touch position with regard to the touch (S2620); applying a first force driving signal FDS1 to all or some of the multiple first electrodes E1, during a force driving period FD within a touch mode period TM, and simultaneously applying a second force driving signal FDS2 to a second electrode E2, thereby sensing the touch force with regard to the touch (S2630); and the like.

The above-mentioned separate driving method, when employed, makes it possible to separately sense the touch position and the touch force, with regard to a touch generated by a pointer such as a finger, a pin, or the like, through different driving schemes, respectively, thereby accurately sensing the touch position and the touch force.

Figure 27A:
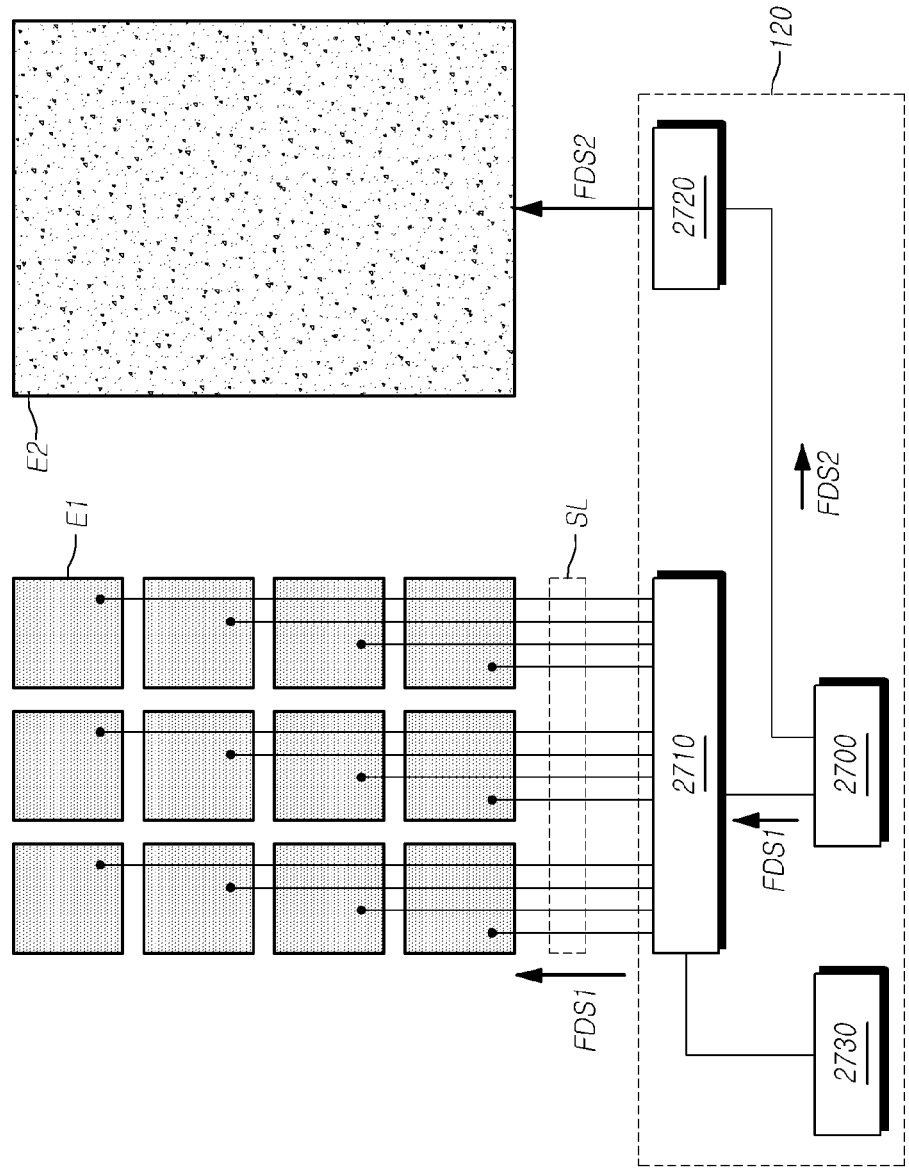
FIG. 27A and FIG. 27B are diagrams illustrating a driving circuit for separate driving by a touch display device according to the present embodiments.
Figure 27B:
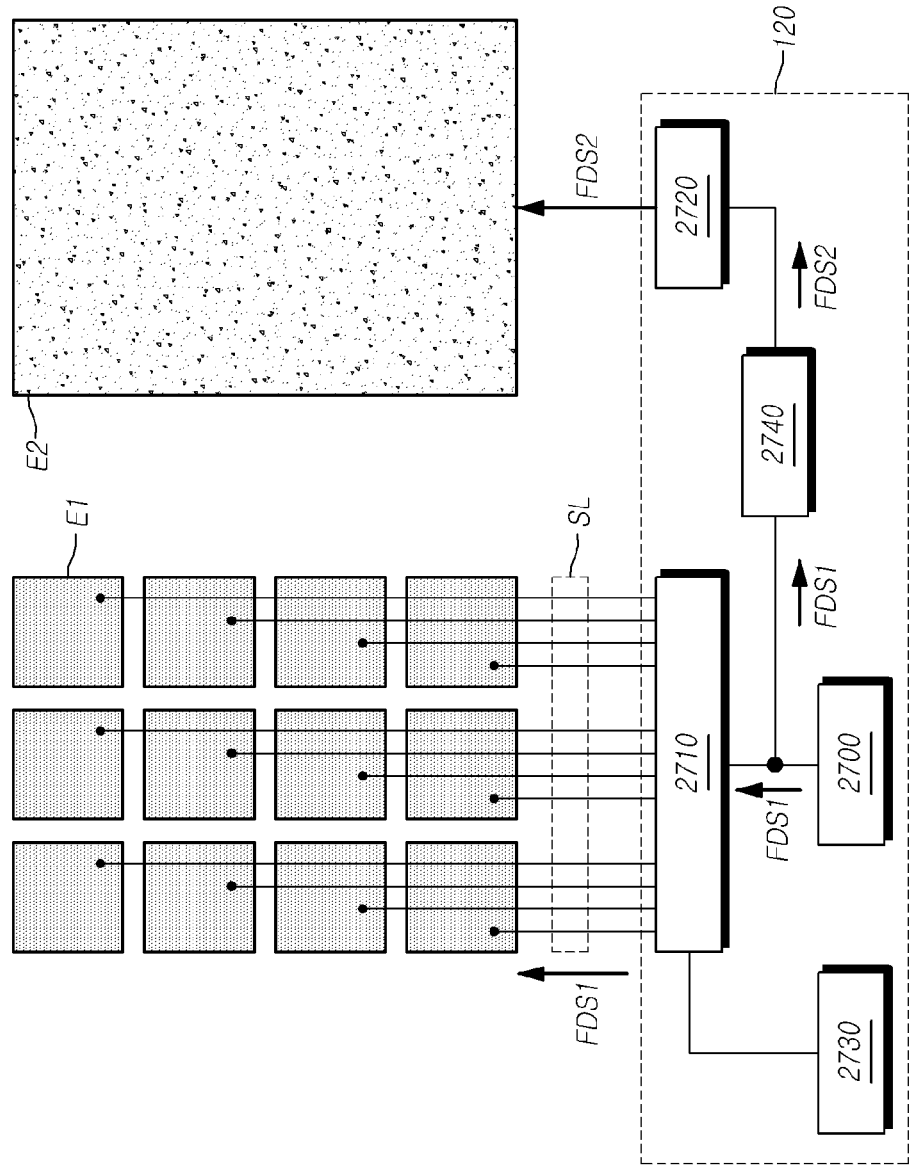

FIG. 27A and FIG. 27B are diagrams illustrating a driving circuit 120 for separate driving by a touch display device 100 according to the present embodiments.

Referring to FIG. 27A and FIG. 27B, assuming that the touch display device 100 according to the present embodiments separately conducts driving for sensing a touch position and driving for sensing a touch force during a touch mode period TM, the driving circuit 120 of the touch display device 100 may include a signal generating circuit 2700, a first electrode driving circuit 2710, a second electrode driving circuit 2720, and the like.

The signal generating circuit 2700 may generate and output a touch driving signal TDS and a first force driving signal FDS1.

In this regard, the touch driving signal TDS corresponds to a first electrode driving signal DS1, which is generated and output during a touch driving period TD, and the first force driving signal FDS1 corresponds to a first electrode driving signal DS1, which is generated and output during a force driving period FD.

The signal generating circuit 2700 may additionally generate a second force driving signal FDS2, which corresponds to a second electrode driving signal DS2. FIG. 27A is a diagram illustrating a driving circuit 120 when the signal generating circuit 2700 generates a second force driving signal FDS2, and FIG. 27B is a diagram illustrating the driving circuit 120 when the signal generating circuit 2700 does not generate the second force driving signal FDS2.

Referring to FIG. 27A and FIG. 27B, the first electrode driving circuit 2710 applies a display driving voltage DDV (for example, Vcom) to multiple first electrodes E1, which are embedded in the display panel 110, during a display mode period DM, successively applies a touch driving signal TDS, which corresponds to a first electrode driving signal DS1, to at least one of the multiple first electrodes E1 during a touch mode period TM, receives an input of a first force driving signal FDS1 during a force driving period FD within the touch mode period TM, and applies a first force driving signal FDS1, which corresponds to the first electrode driving signal DS1, to all or some of the multiple first electrodes E1.

The first electrode driving circuit 2710 may include the integrator 730, the analog-digital converter ADC, and the like, illustrated in FIG. 7.

Assuming that the multiple first electrodes E1 are one of display driving electrodes, to which a display driving voltage DDV is applied during a display mode period DM, the first electrode driving circuit 2710 may apply the display driving voltage to all of the multiple first electrodes E1 during the display mode period DM.

Therefore, the multiple first electrodes E1 play the role of display driving electrodes in a display mode period DM, play the role of a touch sensor in a touch mode period TM, and play the role of a force sensor in a force driving period FD.

Referring to FIG. 27A and FIG. 27B, the second electrode driving circuit 2720 is a circuit for applying a second force driving signal FDS2, which corresponds to a second electrode driving signal DS2, to a second electrode E2, which is positioned outside the display panel 110, in a touch mode period TM. For example, the second electrode driving circuit 2720 may be implemented as at least one printed circuit, on which signal wiring is arranged so as to transfer a second force driving signal FDS2, which corresponds to a second electrode driving signal DS2, to the second electrode E2.

Using the above-mentioned driving circuit 120 makes it possible to provide a touch sensing function of sensing a touch position and a force sensing function of sensing a touch force. Particularly, driving for sensing a touch position and driving for sensing a touch force can proceed separately, thereby providing two kinds of touch-related driving and sensing independently and accurately.

Referring to FIG. 27A, the signal generating circuit 2700 may further generate and output a second force driving signal FDS2, which corresponds to a second electrode driving signal DS2.

Accordingly, the second electrode driving circuit 2720 may transfer the second force driving signal FDS2, which corresponds to the second electrode driving signal DS2 that has been generated and output by the signal generating circuit 2700, to the second electrode E2.

Given that the signal generating circuit 2500 additionally generates and outputs a second force driving signal FDS2, which corresponds to a second electrode driving signal DS2, besides the touch driving signal TDS and the first force driving signal FDS1, which are first electrode driving signals DS1, as illustrated in FIG. 27A, force driving in the force driving period FD may be facilitated by using the second force driving signal FDS2, which has a type different from that of the first force driving signal FDS1.

Referring to FIG. 27B, the signal generating circuit 2700 does not generate the second force driving signal FDS2, which corresponds to the second electrode driving signal DS2; therefore, the driving circuit 120 may further comprise a signal converter 2740 configured to convert the first force driving signal FDS1, which corresponds to the first electrode driving signal DS1 that has been generated by the signal generating circuit 2700, thereby generating a second force driving signal FDS2 that corresponds to a second electrode driving signal DS2.

The signal converter 2740 may convert at least one of the amplitude, phase, and the like of the first force driving signal FDS1, for example, thereby generating a second force driving signal FDS2.

In this case, the signal generating circuit 2700 has only to generate the first force driving signal FDS1, which corresponds to the first electrode driving signal DS1; as a result, the signal generating burden can be alleviated, and efficient touch driving can be provided.

The signal converter 2740 may include, for example, a level shifter configured to adjust the signal voltage level, may include a phase controller configured to control the signal phase, and may include a DA converter configured to convert a DC signal to an AC signal (pulse signal) or an AD converter configured to convert an AC signal (pulse signal) to a DC signal. The signal converter 2740 may be regarded as a second electrode driving circuit 2720, and may also be regarded as being included in the second electrode driving circuit 2720.

Referring to FIG. 27A and FIG. 27B, the driving circuit 120 may further include a sensing processor 2730 configured to sense the touch position on basis of a signal received from each first electrode E1 through the first electrode driving circuit 2510 in a touch driving period TD and configured to sense the touch force on basis of a signal received from each first electrode E1 through the first electrode driving circuit 2510 in a force driving period FD.

The sensing processor 2730 may have a configuration corresponding to that of the processor 740 illustrated in FIG. 7.

As described above, the sensing processor 2730 receives a signal, which has been received from the first electrode E1, through the first electrode driving circuit 2510 during a touch driving period TD, thereby sensing the touch position, and receives a signal, which has been received from the first electrode E1, through the first electrode driving circuit 2510 during a force driving period FD, thereby sensing the touch force; as such, two kinds of sensing can be performed accurately.

On the other hand, each of the signal generating circuit 2700, the first electrode driving circuit 2710, and the sensing processor 2730 may be implemented as a separate integrated circuit or a processor.

For example, the signal generating circuit 2700 may be implemented as a power IC, and the sensing processor 2730 may be a MCU (Micro Controller Unit). The first electrode driving circuit 2710 may be implemented as a first electrode driving IC.

On the other hand, at least two of the signal generating circuit 2700, the first electrode driving circuit 2710, and the sensing processor 2730 may be implemented as a single IC.

For example, the signal generating circuit 2700 and the first electrode driving circuit 2710 may be included in a single IC and implemented as such.

As another example, the signal generating circuit 2700, the first electrode driving circuit 2710, and the sensing processor 2730 may be integrally included in a single IC and implemented as such.

On the other hand, the first electrode driving circuit 2710 may further include a data driving circuit configured to apply a data voltage to multiple data lines, which are arranged on the display panel 110, during a display mode period.

As described above, the fact that the driving circuit 120 can be implemented in various types makes it possible to design a driving circuit 120, which is optimized to the size of the touch display device 100 (for example, medium/large TV size, mobile terminal size, or the like), the system environment, or the power supply system environment.

Figure 28:
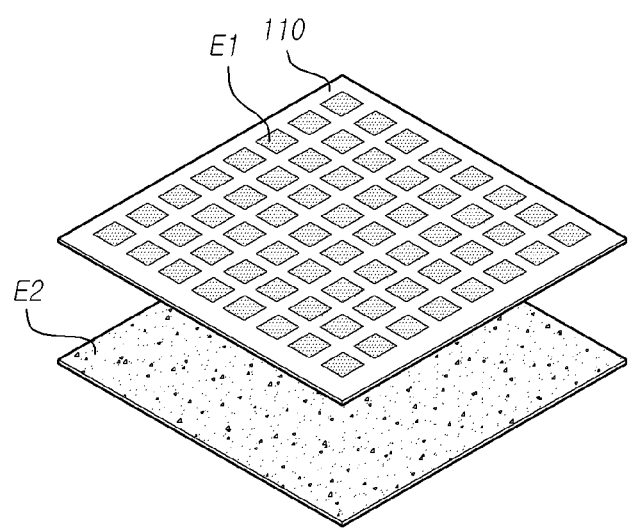
FIG. 28 and FIG. 29 illustrate exemplary arrangements of first electrodes and second electrodes in connection with a touch display device according to the present embodiments.
Figure 29:
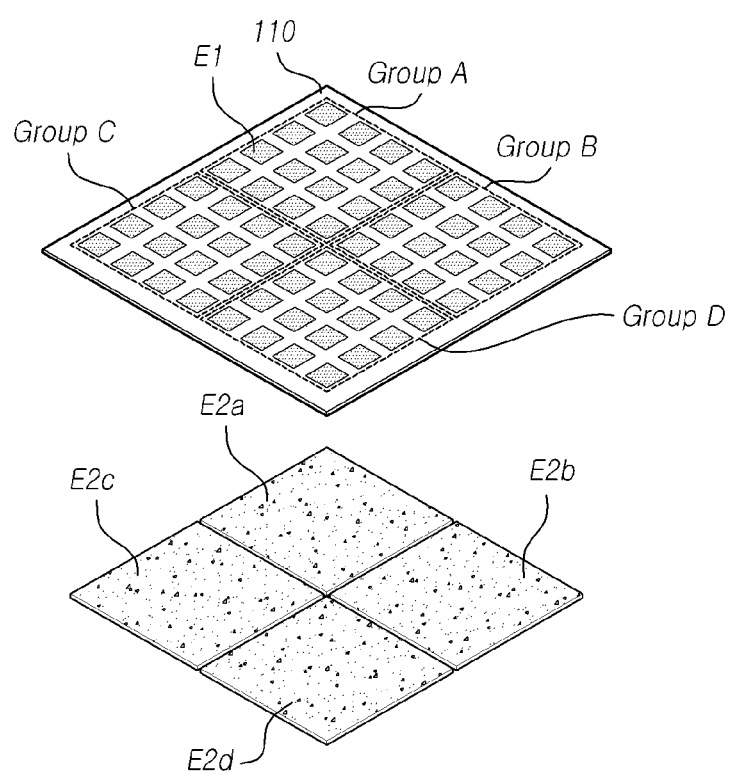

FIG. 28 and FIG. 29 illustrate exemplary arrangements of first electrodes E1 and second electrodes E2 in connection with a touch display device 100 according to the present embodiments.

FIG. 28 and FIG. 29 illustrate examples in which sixty-four first electrodes E1 are embedded and arranged in the display panel 110.

Referring to FIG. 28, when the second electrode E2 is a single bulk electrode, the second electrode E2 may be positioned to face the sixty-four first electrodes E1.

Referring to FIG. 29, two or more second electrodes E2 may exist.

For example, assuming for example that four second electrodes E2*a*, E2*b*, E2*c*, and E2*d* exist, each of the four second electrodes E2*a*, E2*b*, E2*c*, and E2*d* may be positioned to face sixteen first electrodes among the sixty-four first electrodes E1.

In this regard, the number of second electrodes may be identical to the number of first electrodes, or may be larger or smaller than the number of first electrodes.

The number of second electrodes may be determined in view of the driving efficiency for sensing a touch force, the sensing accuracy, and the like.

Referring to FIG. 29, the second electrode E2*a* may be positioned to face a group of sixteen first electrodes (Group A), which have corresponding positions among the first electrodes E1. The second electrode E2*b* may be positioned to face a group of sixteen first electrodes (Group B), which have corresponding positions among the first electrodes E1. The second electrode E2*c* may be positioned to face a group of sixteen first electrodes (Group C), which have corresponding positions among the first electrodes E1. The second electrode E2*d* may be positioned to face a group of sixteen first electrodes (Group D), which have corresponding positions among the first electrodes E1.

When two or more second electrodes E2 exist as in the case of FIG. 29, touch force sensing can be conducted with regard to each second electrode E2.

When the second electrode E2 is a single bulk electrode, as in the case of FIG. 28, it can be advantageously applied to a small display device, such as a mobile display device.

The structure of having two or more second electrodes E2, as in the case of FIG. 29, can be applied to a large-area display device, a public display device, and the like, and can be combined with various applied technologies.

As described above, the present embodiments may provide a touch display device 100, a method for driving the same, and a driving circuit 120, the touch display device 100 being structured such that it cannot only sense the coordinate (position) of a touch generated by the user, but also sense the touch force, with which the user presses the screen during the touch, in order to provide various functions in various types.

The present embodiments may provide a driving circuit 120, a touch display device 100, and a method for driving the same, which enable simultaneous proceeding of driving for sensing a touch position and driving for sensing a touch force during a touch mode period.

The present embodiments may provide a driving circuit 120, a touch display device 100, and a method for driving the same, which enable separate proceedings of driving for sensing a touch position and driving for sensing a touch force during a touch mode period.

The present embodiments may provide a driving circuit 120, a touch display device 100, and a method for driving the same, which can recognize the position of occurrence of a touch force, i.e. a force with which the user's touch presses the screen.

The present embodiments may provide a driving circuit 120, a touch display device 100, and a method for driving the same, which can accurately distinguish between a soft touch, i.e. the force with which the user's touch presses the screen does not exist or is equal to or less than a predetermined level, and a force touch, i.e. the force with which the user's touch presses the screen exists or exceeds the predetermined level.

The present embodiments may provide a touch display device 100 including a display panel 110, on which multiple first electrodes E1 are arranged, at least one second electrode E2 positioned outside the display panel 120, and at least one touch force sensing gap G, which exists between the multiple first electrodes E1 and the at least one second electrode E2, and which can change its size according to a touch force such that touch force sensing is possible.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

BRIEF DESCRIPTION OF REFERENCE NUMERALS

100: touch display device
110: display panel
120: driving circuit
E1: first electrode
E2: second electrode

What is claimed is:

1. A touch display device comprising:
a plurality of first electrodes embedded in a display panel;
at least one second electrode positioned outside the display panel and capacitively coupled to each of the first electrodes;
a gap structure unit configured to change a capacitance between the first electrodes and the at least one second electrode responsive to a touch applied on a surface of the display panel; and a driving circuit coupled to the first electrodes and the at least one second electrode, the driving circuit configured to:
apply a first electrode driving signal to at least one of the plurality of first electrodes in at least part of a touch mode period;
apply a second electrode driving signal to the at least one second electrode in the touch mode period, and apply a common voltage to the plurality of first electrodes in a display mode period that does not overlap with the touch mode period, wherein the common voltage is a display driving voltage corresponding to a low level of the first electrode driving signal.

2. The touch display device of claim 1, wherein the gap structure unit is positioned beneath the display panel to support an edge portion of the display panel.

3. The touch display device of claim 1, wherein the second electrode driving signal is applied simultaneously with the first electrode driving signal in the touch mode period.

4. The touch display device of claim 3, wherein the first electrode driving signal is a pulse signal, and the second electrode driving signal is a pulse signal or a DC voltage signal.

5. The touch display device of claim 4, wherein the first electrode driving signal and the second electrode driving signal have an equiphase relationship.

6. The touch display device of claim 5, wherein the second electrode driving signal has the same phase as the first electrode driving signal and has an amplitude larger than the first electrode driving signal.

7. The touch display device of claim 1, wherein the touch mode period comprises:
a touch driving period for sensing a touch position responsive to applying the first electrode driving signal and the second electrode driving signal; and
a force driving period for sensing a touch force responsive to applying the first electrode driving signal and the second electrode driving signal.

8. The touch display device of claim 7, wherein the driving circuit further is configured to:
determine the touch position based on a signal received from each of the first electrodes responsive to applying a touch driving signal as the first electrode driving signal to at least one of the first electrodes in the touch driving period, and
determine the touch force from a signal received from each of the first electrodes but not from the at least one second electrode responsive to applying (i) a first force driving signal as the first electrode driving signal to all or some of the first electrodes in the force driving period and (ii) a second force driving signal as the second electrode driving signal to the at least one second electrode.

9. The touch display device of claim 8, wherein:
the first force driving signal and the second force driving signal are pulse signals,
the first force driving signal is a signal having a first DC voltage, and the second force driving signal is a signal having a second DC voltage,
the first force driving signal is a first pulse signal, and the second force driving signal is a signal having the second DC voltage, or
the first force driving signal is a signal having the first DC voltage, and the second force driving signal is a second pulse signal.

10. The touch display device of claim 9, wherein the first force driving signal and the second force driving signal have an equiphase relationship.

11. The touch display device of claim 10, wherein the second force driving signal has the same phase as the first force driving signal and has an amplitude larger than the first force driving signal.

* * * * *